(12) United States Patent
Okamoto et al.

(10) Patent No.: US 8,124,712 B2
(45) Date of Patent: Feb. 28, 2012

(54) FILLER FOR OPTICAL ISOMER SEPARATION

(75) Inventors: Yoshio Okamoto, Nagoya (JP); Chiyo Yamamoto, Suzuka (JP); Tomoyuki Ikai, Nagoya (JP); Masami Kamigaito, Nagoya (JP)

(73) Assignees: National University Corporation Nagoya University, Aichi (JP); Daicel Chemical Industries, Ltd., Osaka (JP)

( * ) Notice: Subject to any disclaimer, the term of this patent is extended or adjusted under 35 U.S.C. 154(b) by 430 days.

(21) Appl. No.: 12/227,150

(22) PCT Filed: May 2, 2007

(86) PCT No.: PCT/JP2007/059371
§ 371 (c)(1),
(2), (4) Date: Dec. 19, 2008

(87) PCT Pub. No.: WO2007/129658
PCT Pub. Date: Nov. 15, 2007

(65) Prior Publication Data
US 2009/0105440 A1    Apr. 23, 2009

(30) Foreign Application Priority Data
May 9, 2006 (JP) .................. 2006-130401

(51) Int. Cl.
*C07H 1/00* (2006.01)
*B01J 20/10* (2006.01)
(52) U.S. Cl. ............... 528/26; 528/28; 528/29
(58) Field of Classification Search ......... 528/26, 528/28, 29
See application file for complete search history.

(56) References Cited

U.S. PATENT DOCUMENTS
5,811,532 A    9/1998   House

FOREIGN PATENT DOCUMENTS

| | | |
|---|---|---|
| EP | 1 500 430 A2 | 1/2005 |
| EP | 1 500 430 A3 | 5/2006 |
| JP | 60-196663 | 10/1985 |
| JP | 2002-241317 | 8/2002 |
| JP | 2002-323483 | 11/2002 |
| JP | 2004-163110 | 6/2004 |
| JP | 2005-017268 | 1/2005 |
| JP | 2005-315668 | 11/2005 |
| WO | WO 2004/095018 | 11/2004 |

OTHER PUBLICATIONS

European Patent Office Search Report dated Nov. 19, 2009 (9 pages).
Xiaoming Chen et al., "Synthesis of covalently bonded cellulose derivative chiral stationary phases with a bifunctional reagent of 3-(triethoxysilyl) propyl isocyanate", Journal of Chromatography, vol. 1010, No. 2, Aug. 29, 2003, pp. 185-194.
Feng Qin, et al., "improved Procedure for Preparation of Covalently Bonded Cellulose Tris-phenylcarbamate Chiral Stationary Phases", Chinese Journal of Chemistry (2005), 23(7), 885-890.
Separation of the Optical Isomers of Amino Acids by Ligand-Exchange Chromatography Using Chemically Bonded Chiral Phases, by G. Gübitz et al, Journal of Chromatography, vol. 203, 1981, pp. 377-384.
Chiral Resolution of Dipeptides by Ligand Exchange Chromatography on Chemically Bonded Chiral Phases, by G. Gübitz et al, J. Liq. Chrom. & Rel. Technol., vol. 19, No. 17 & 18, 1996, pp. 2933-2942.
Chiral-Bonded Silica Gel Stationary Phases Obtained From Chiral Silanes for High-Performance Liquid Chromatography, by L. Oliveros et al, Journal of Chromatography, vol. 606, 1992, pp. 9-17.

*Primary Examiner* — Ling Choi
*Assistant Examiner* — Chun-Cheng Wang
(74) *Attorney, Agent, or Firm* — Flynn, Thiel, Boutell & Tanis, P.C.

(57) ABSTRACT

A filler for optical isomer separation which: allows a polymer compound derivative to be immobilized on the surface of a carrier at a high ratio and is excellent in optical separation ability. The filler is characterized in that the filler is obtained by modifying part of the hydroxy or amino groups of a polymer compound having the hydroxy or amino groups with molecules of a compound represented by the following general formula (I): A-X—Si$(Y)_n R_{3-n}$, and is carried by a carrier through chemical bonding.

9 Claims, 20 Drawing Sheets

FILLER FOR OPTICAL ISOMER SEPARATION

TECHNICAL FIELD

The present invention relates to a filler for optical isomer separation, and a method of producing the filler for optical isomer separation.

BACKGROUND ART

Optical resolution by chromatography has conventionally been attracting attention remarkably in various fields including analytical chemistry, organic chemistry, medicine, and pharmacy, and a large number of chiral stationary phases have been reported in the world. In particular, for example, an ester derivative or carbamate derivative obtained by chemically modifying cellulose or amylose as an optically active polymer serves as a chiral stationary phase having a high optical resolution, and a filler for chromatography using this derivative has been known to the public. A filler for chromatography using this polymer compound derivative is used in a state of being carried by a carrier such as silica gel for the purposes of, for example, increasing the ratio at which a column is filled with the filler, and improving the ease of handling and mechanical strength of the filler.

For example, Patent Document 1 describes a filler for chromatography obtained by causing a carrier such as silica to carry a cellulose derivative containing an aromatic ring. In addition, Patent Document 2 describes a filler for chromatography obtained by causing a carrier such as silica to carry a carbamate derivative of a polysaccharide such as amylose.

However, the above conventional fillers for chromatography each using a polymer compound such as a polysaccharide derivative are each such that the polymer compound merely is adsorbed physically to the carrier so as to be carried. Accordingly, in some elution solvents, the polymer compound dissolves in any one of the elution solvents, with the result that each of the fillers becomes unusable in some cases.

In particular, the fractionation of a large amount of optical isomers requires the dissolution of a high concentration of a raw material before separation in an elution solvent. An elution solvent capable of meeting the requirement has been perceived as a problem because a polymer compound such as a polysaccharide derivative generally shows a high solubility in the elution solvent.

In addition, the polymer compound such as a polysaccharide derivative has so small a mechanical strength that the following problem arises, particularly when the polymer compound is used for HPLC, the polymer compound cannot withstand a pressure at the time of using HPLC.

In order that those problems may be prevented, attempts have been made to bond the polymer compound, such as a polysaccharide derivative, chemically to the surface of a carrier to improve the mechanical strength of the polymer compound as well as to prevent the elution of the polymer compound due to an elution solvent.

For example, Patent Document 3 discloses a filler for chromatography obtained by chemically bonding an optically active polymer compound to silica gel. However, in the above filler for chromatography described in Patent Document 3, only a trace amount of the polymer compound chemically bonded to the surface of a carrier such as silica contributes to optical resolution, so the filler is susceptible to improvement so that the filler may achieve an additionally high separation ability. In addition, the above filler described in Patent Document 3 cannot be produced efficiently because the filler requires a large number of steps for bonding the polymer compound and silica gel.

In addition, Patent Document 4 describes the following method: a polymerizable group is introduced into each of a polysaccharide and a carrier, and the polysaccharide is chemically bonded to the carrier by the copolymerization of the polysaccharide and the carrier in the presence of a compound having any other polymerizable unsaturated group. However, a reaction time required for the radical polymerization is as long as twenty hours, and the number of steps increases when the polymerizable group is introduced into the carrier. Accordingly, the production of a filler cannot be efficiently performed by the method, so the method is susceptible to improvement.

Meanwhile, Non-patent Document 1 discloses a cellulose derivative to be used in the separation of optical isomers, and describes a method involving the use of a silane coupling agent as a spacer for chemically bonding the cellulose derivative onto a silica matrix. However, NMR analysis has shown that the cellulose derivative obtained by the method shows no signal derived from silica, so it has been estimated that substantially no silane coupling agent is introduced into the cellulose derivative.

Patent Document 1: JP 60-142930 A
Patent Document 2: JP 60-226831 A
Patent Document 3: JP 60-196663 A
Patent Document 4: JP 2002-148247 A
Non Patent Document 1: J. Chromatogr. A, 1010 (2003) 185-194

DISCLOSURE OF THE INVENTION

Problems to be Solved by the Invention

An object of the present invention is to provide a filler for optical isomer separation which has an excellent solvent resistance, ability to fractionate a large amount of optical isomers and mechanical strength. Another object of the present invention is to provide a filler for optical isomer separation which: allows a polymer compound such as a polysaccharide derivative to be immobilized on the surface of a carrier at a high ratio; and is excellent in optical separation ability. Another object of the present invention is to provide a method in which the number of steps upon chemical bonding of a polymer compound, such as a polysaccharide derivative, to the surface of a carrier is reduced so that the production of a filler may be efficiently performed.

Means for Solving the Problems

The present invention has been made in view of the above circumstances. The inventors of the present invention have made extensive studies and, as a result, have found that a compound having silicon can be efficiently and controllably introduced into a polymer compound as a raw material for a filler for optical isomer separation by completely dissolving the polymer compound before the derivatization of the polymer compound and by specifying the order in which the polymer compound is derivatized with multiple compounds including the compound having silicon. In addition, the inventors have found that the above polymer compound derivatized with the compound having silicon can be carried by a carrier through chemical bonding at a high immobilization ratio by subjecting the polymer compound to a reaction under a specific condition after causing the carrier to carry the polymer compound.

The inventors of the present invention have completed the present invention on the basis of those findings. That is, the gists of the present invention are as follows:

(1) a filler for optical isomer separation, including a polymer compound derivative, which is obtained by modifying part of hydroxy or amino groups of a polymer compound having the hydroxy or amino groups with molecules of a compound represented by the following general formula (I), and is carried by a carrier through chemical bonding:

$$A\text{-}X\text{—}Si(Y)_n R_{3-n} \quad (I)$$

where A represents a reactive group which reacts with a hydroxy or amino group, X represents an alkylene group which has 1 to 18 carbon atoms and which may have a branch, or an arylene group which may have a substituent, Y represents a reactive group which reacts with a silanol group to form a siloxane bond, R represents an alkyl group which has 1 to 18 carbon atoms and which may have a branch, or an aryl group which may have a substituent, and n represents an integer of 1 to 3;

(2) a filler for optical isomer separation according to item (1), in which the polymer compound is an optically active organic polymer compound;

(3) a filler for optical isomer separation according to item (2), in which the optically active organic polymer compound is a polysaccharide;

(4) a filler for optical isomer separation according to item (3), in which the polysaccharide is cellulose or amylose;

(5) a filler for optical isomer separation according to any one of items (1) to (4) in which the compound represented by the general formula (I) is 3-isocyanate propyl triethoxysilane, 3-isocyanate propyl trimethoxysilane, 3-isocyanate propyl diethoxymethylsilane, 2-isocyanate ethyl triethoxysilane, 4-isocyanate phenyl triethoxysilane, 3-glycidoxy propyl trimethoxysilane, 3-glycidoxy propyl triethoxysilane, or 3-thiocyanatepropyl triethoxysilane;

(6) a filler for optical isomer separation according to any one of items (1) to (5), in which a ratio of introduction of the molecules of the compound represented by the general formula (I) into the hydroxy or amino groups of the polymer compound having the hydroxy or amino groups is 1.0 to 35%;

(7) a filler for optical isomer separation according to any one of items (1) to (6), in which at least part of the hydroxy or amino groups except the hydroxy or amino groups modified with the molecules of the compound represented by the general formula (I) are further modified with molecules of a compound having a functional group which acts on an optical isomer;

(8) a filler for optical isomer separation according to item (7), in which the molecules of the compound having a functional group which acts on an optical isomer are introduced into the at least part of the hydroxy or amino groups except the hydroxy or amino groups modified with the molecules of the compound represented by the general formula (I) through a urethane bond, a urea bond, an ester bond, or an ether bond;

(9) a filler for optical isomer separation according to item (7), in which the compound having a functional group which acts on an optical isomer is a compound containing an atomic group represented by the following general formula (II) or (III):

$$\text{—CO—R'} \quad (II)$$

$$\text{—CO—NH—R'} \quad (III)$$

where R' represents an aliphatic or aromatic hydrocarbon group which may contain a heteroatom, and the aliphatic or aromatic hydrocarbon group may be unsubstituted or may be substituted with one or more groups selected from the group consisting of a hydrocarbon group which has 1 to 12 carbon atoms and which may contain a heteroatom, a cyano group, a halogen group, a hydroxy group, a nitro group, an amino group, and a dialkylamino group containing two alkyl groups, each having 1 to 8 carbon atoms;

(10) a filler for optical isomer separation according to item (9), in which the compound having a functional group which acts on an optical isomer is 3,5-dimethylphenyl isocyanate, 3,5-dichlorophenyl isocyanate, 1-phenylethyl isocyanate, or 4-methylbenzoyl chloride;

(11) a method of producing a filler for optical isomer separation including the steps of: producing a polymer compound derivative obtained by modifying part of hydroxy or amino groups of a polymer compound having the hydroxy or amino groups with molecules of a compound represented by the following general formula (I); and causing a carrier to carry the polymer compound derivative through chemical bonding:

$$A\text{-}X\text{—}Si(Y)_n R_{3-n} \quad (I)$$

where A represents a reactive group which reacts with a hydroxy or amino group, X represents an alkylene group which has 1 to 18 carbon atoms and which may have a branch, or an arylene group which may have a substituent, Y represents a reactive group which reacts with a silanol group to form a siloxane bond, R represents an alkyl group which has 1 to 18 carbon atoms and which may have a branch, or an aryl group which may have a substituent, and n represents an integer of 1 to 3;

(12) a method of producing a filler for optical isomer separation according to item (11), in which the step of producing the polymer compound derivative includes a first modifying step of modifying the hydroxy or amino groups of the polymer compound having the hydroxy or amino groups, the polymer compound being dissolved, with molecules of a compound except the compound represented by the general formula (I), and a second modifying step of modifying the hydroxy or amino groups of the polymer compound which remain unmodified in the first modifying step with the molecules of the compound represented by the general formula (I); and

(13) a method of producing a filler for optical isomer separation according to item (11) or (12), characterized in that the step of causing the carrier to carry the polymer compound derivative through chemical bonding is performed under an acid condition.

Effects of the Invention

According to the present invention, there can be provided a filler for optical isomer separation having an excellent solvent resistance, ability to fractionate a large amount of optical isomers, and mechanical strength. In addition, according to the present invention, there can be provided a filler for optical isomer separation which: allows a polymer compound, such as a polysaccharide derivative, to be immobilized on the surface of a carrier at a high ratio; and is excellent in optical separation ability. Further, according to the present invention, there can be provided a method in which the number of steps upon chemical bonding of a polymer compound such as a polysaccharide derivative to the surface of a carrier is reduced so that the production of a filler may be efficiently performed.

BEST MODE FOR CARRYING OUT THE INVENTION

Figure 1:
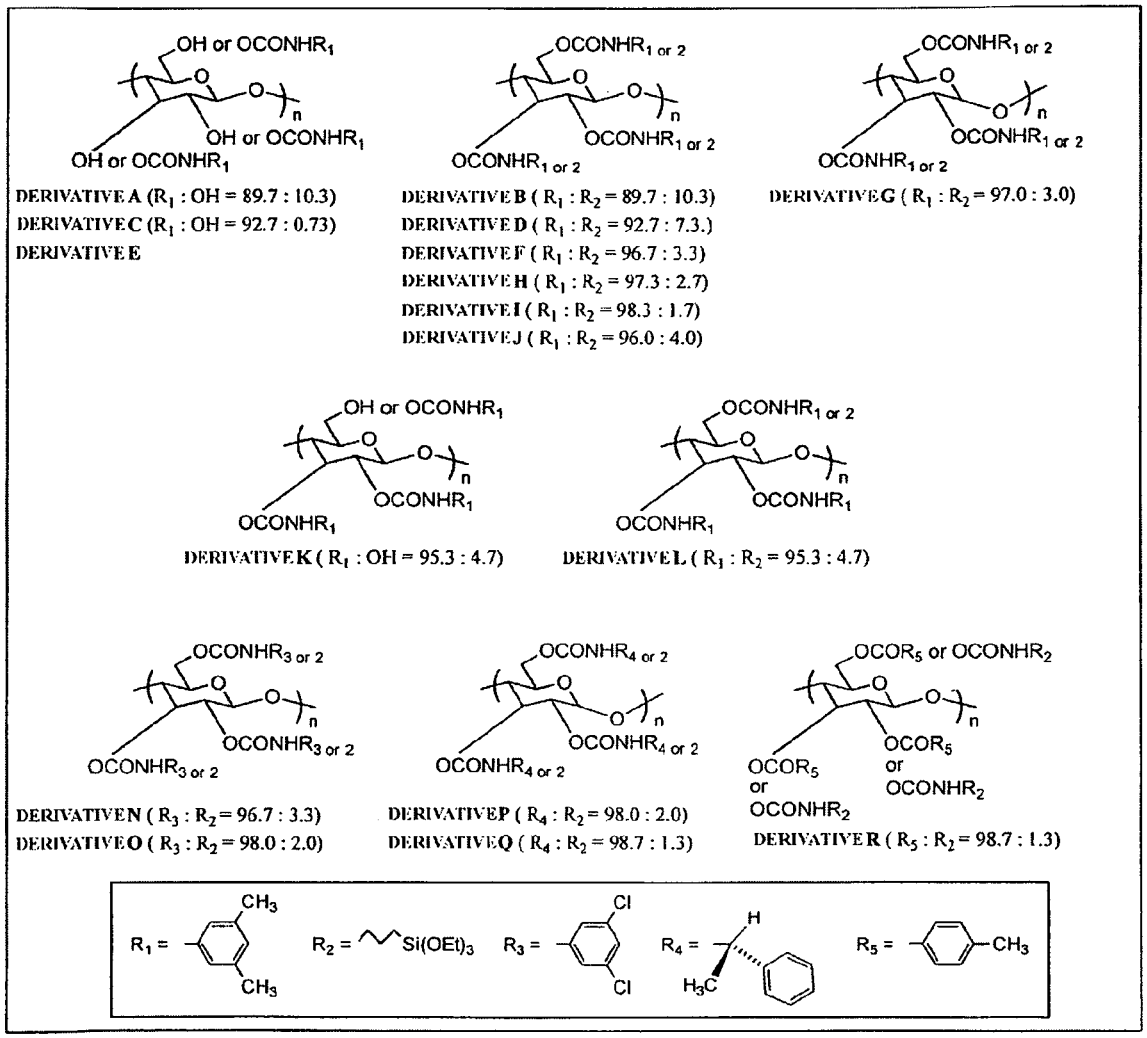
FIG. 1 is a view showing the structures of polymer compound derivatives (cellulose or amylose derivatives) obtained in the Examples.

Hereinafter, the present invention will be described in detail.

<1> Filler for Optical Isomer Separation of the Present Invention (which May Hereinafter be Referred to as "Filler of the Present Invention")

A filler for optical isomer separation of the present invention is characterized in that a polymer compound derivative obtained by modifying part of the hydroxy or amino groups of a polymer compound having the hydroxy or amino groups with molecules of a compound represented by the following general formula (I) is carried by a carrier through chemical bonding.

A-X—Si(Y)$_n$R$_{3-n}$ (I)

where A represents a reactive group which reacts with a hydroxy or amino group, X represents an alkylene group which has 1 to 18 carbon atoms and which may have a branch, or an arylene group which may have a substituent, Y represents a reactive group which reacts with a silanol group to form a siloxane bond, R represents an alkyl group which has 1 to 18 carbon atoms and which may have a branch, or an aryl group which may have a substituent, and n represents an integer of 1 to 3.

In the present invention, the polymer compound derivative means a polymer compound obtained by modifying at least part of the hydroxy or amino groups of a polymer compound having the hydroxy or amino groups with molecules of a modifying compound. When the polymer compound to be used as a raw material for the production of the above polymer compound derivative is a polysaccharide, the polymer compound derivative is a polysaccharide derivative.

The above polymer compound to be used in the production of the filler for optical isomer separation of the present invention is preferably an optically active organic polymer compound, more preferably a polysaccharide. Any one of the natural polysaccharides, synthetic polysaccharides, and natural product-denatured polysaccharides can be preferably used as the above polysaccharide as long as the polysaccharide to be used has chirality. Of those, a polysaccharide in which monosaccharides are regularly bonded to each other is suitable because the polysaccharide can additionally improve the ability of the filler to separate optical isomers.

Examples of the polysaccharide include β-1,4-glucan (cellulose), α-1,4-glucan (amylose, amylopectin), α-1,6-glucan (dextran), β-1,6-glucan (pustulan), β-1,3-glucan (cardran, schizophyllan), α-1,3-glucan, β-1,2-glucan (Crown Gall polysaccharide), β-1,4-galactan, β-1,4-mannan, α-1,6-mannan, 3-1,2-fructan (inulin), β-2,6-fructan (levan), β-1,4-xylan, β-1,3-xylan, β-1,4-chitosan, β-1,4-N-acetylchitosan (chitin), pullulan, agarose, alginic acid, α-cyclodextrin, β-cyclodextrin, γ-cyclodextrin, and starches each containing amylose.

Of those, preferred are cellulose, amylose, β-1,4-chitosan, chitin, β-1,4-mannan, β-1,4-xylan, inulin, and cardran. More preferred are cellulose and amylose, with each of which a polysaccharide having high purity can be obtained.

A number average polymerization degree of the polysaccaride (average number of the pyranose or furanose ring contained in one molecule) is preferably 5 or more, and more preferably 10 or more. There is no particular upper limitation, the number average polymerization degree is preferably 1,000 or less from a viewpoint of easy handling, more preferably 5 to 1,000, still more preferably 10 to 1,000, and particularly preferably 10 to 500.

In the above general formula (I), A represents a reactive group which reacts with a hydroxy or amino group, or preferably represents, for example, a chlorocarbonyl group, a carboxyl group, an isocyanate group, a glycidyl group, or a thiocyanate group, X represents an alkylene group which has 1 to 18 carbon atoms and which may have a branch or which may have a heteroatom introduced into itself, or an arylene group which may have a substituent, preferably represents an alkylene group which has 1 to 18 carbon atoms and which may have a branch, or particularly preferably represents, for example, a propylene group, an ethylene group, or a butylene group, Y represents a reactive group which reacts with a silanol group to form a siloxane bond, preferably represents, for example, an alkoxy group having 1 to 12 carbon atoms or a halogen group, or particularly preferably represents, for example, a methoxy group, an ethoxy group, or a propoxy group, R represents an alkyl group which has 1 to 18 carbon atoms and which may have a branch, or an aryl group which may have a substituent, or preferably represents, for example, an ethyl group or a methyl group, and n represents an integer of 1 to 3.

Examples of the compound represented by the above general formula (I) include 3-isocyanate propyl triethoxysilane, 3-isocyanate propyl trimethoxysilane, 3-isocyanate propyl diethoxymethylsilane, 2-isocyanate ethyl triethoxysilane, 4-isocyanate phenyl triethoxysilane, 3-glycidoxy propyl trimethoxysilane, 3-glycidoxy propyl triethoxysilane, and 3-thiocyanate propyl triethoxysilane. Preferred are 3-isocyanate propyl triethoxysilane and 3-isocyanate propyl trimethoxysilane.

In the above polymer compound derivative, molecules of the above compound represented by the general formula (I) are introduced into part of the hydroxy or amino groups of the above polymer compound having the hydroxy or amino groups.

The positions at which the molecules of the above compound represented by the general formula (I) are introduced into the hydroxy or amino groups of the above polymer compound having the hydroxy or amino groups are not particularly limited.

In addition, the above term "part" can be represented as a ratio of introduction of the molecules of the above compound represented by the general formula (I) into the hydroxy or amino groups of the polymer compound having the hydroxy or amino groups. The ratio of introduction is preferably 1.0 to 35%, more preferably 1.5 to 20%, or particularly preferably 2.0 to 10%. The reason why a ratio of introduction of the molecules of the above compound represented by the general formula (I) of less than 1.0% or in excess of 35% is not preferable is as follows: when the ratio is less than 1.0%, the ratio at which the polymer compound derivative is immobilized on a carrier such as silica gel through chemical bonding reduces while, when the ratio exceeds 35%, the optical resolution of the filler reduces.

In addition, the above ratio of introduction (%) is defined as follows: when the polymer compound to be used in the production of the polymer compound derivative of the present invention has only hydroxy groups, the ratio of introduction is a numerical value obtained by multiplying a ratio of the number of hydroxy groups modified with the molecules of the above compound represented by the general formula (I) to the total number of the hydroxy groups of the polymer compound by 100; when the above polymer compound has only amino groups, the ratio of introduction is a numerical value obtained by multiplying a ratio of the number of amino groups modified with the molecules of the above compound represented by the general formula (I) to the total number of the amino groups by 100; or when the above polymer compound has hydroxy groups and amino groups, the ratio of introduction is a numerical value obtained by multiplying a ratio of the sum of the numbers of hydroxy groups and amino groups modified with the molecules of the above compound represented by the general formula (I) to the sum of the total number of the hydroxy groups and the total number of the amino groups by 100. In addition, in the present invention, the same definition as that described above is applicable also to the ratio of introduction of molecules of a compound except the above compound represented by the general formula (I).

In the above polymer compound derivative, at least part of the hydroxy or amino groups, except for the hydroxy or amino groups modified with the molecules of the above compound represented by the general formula (I), are preferably further modified with molecules of a compound having a functional group which acts on an optical isomer.

The above functional group is a functional group which acts on an optical isomer in a sample containing optical isomers to be separated. The action of the functional group on the optical isomer cannot be uniquely defined because the kind of the functional group varies depending on the kinds of the optical isomers to be separated; the action is not particularly limited as long as the action suffices for the optical resolution of the above optical isomers with the above polymer compound derivative. Examples of the above functional group include a group containing an aromatic group which may have a substituent, and an aliphatic group having a cyclic structure. The above aromatic group can contain a heterocyclic ring or a condensed ring. Examples of the substituent which the above aromatic group may have include an alkyl group having up to about 8 carbon atoms, a halogen group, an amino group, and an alkoxyl group. The above functional group is selected in accordance with the kinds of the above optical isomers to be separated.

In addition, the molecules of the compound having the functional group which acts on an optical isomer are preferably introduced into the at least part of the hydroxy or amino groups except the hydroxy or amino groups modified with the molecules of the above compound represented by the general formula (I) through a urethane bond, an ester bond, or an ether bond for a hydroxy group and a urea bond or an amide bond for an amino group; a urethane bond and a urea bond are particularly preferable for a hydroxy group and an amino group, respectively. Therefore, the above compound having the functional group which acts on an optical isomer is a compound having a functional group which can react with a hydroxy or amino group of the above polymer compound as well as the functional group which acts on an optical isomer. The above compound having a functional group which can react with a hydroxy or amino group may be an arbitrary compound as long as the compound is an isocyanic acid derivative, a carboxylic acid, an acid halide, an alcohol, or any other compound having reactivity with a hydroxy or amino group.

It should be noted that neither the ratio of introduction of the molecules of the compound having the above functional group nor the positions at which the molecules of the compound are introduced in the polymer compound is particularly limited, and the ratio and the positions are appropriately selected in accordance with, for example, the kind of the functional group and the kind of the polymer compound.

In the above polymer compound derivative, the sum of the ratio of introduction of the molecules of the above compound represented by the general formula (I) and the ratio of introduction of the molecules of the compound having the above functional group is preferably 90 to 1008, more preferably 97 to 1000, or particularly preferably 1000.

The above compound having a functional group which acts on an optical isomer is preferably a compound containing an atomic group represented by the following general formula (II) or (III).

—CO—R'  (II)

—CO—NH—R'  (III)

In the formulae, R' represents an aliphatic or aromatic hydrocarbon group which may contain a heteroatom, and the aliphatic or aromatic hydrocarbon group may be unsubstituted or may be substituted with one or more groups selected from the group consisting of a hydrocarbon group which has 1 to 12 carbon atoms and which may contain a heteroatom, a cyano group, a halogen group, a hydroxy group, a nitro group, an amino group, and a dialkylamino group containing two alkyl groups each having 1 to 8 carbon atoms.

A monovalent aromatic hydrocarbon group represented by R' described above is, for example, a phenyl, naphthyl, phenanthryl, anthracyl, indenyl, indanyl, furyl, thionyl, pyrryl, benzofuryl, benzothionyl, indyl, pyridyl, pyrimidyl, quinolinyl, or isoquinolinyl group. In addition, a substituent for the monovalent aromatic hydrocarbon group represented by R' is, for example, an alkyl group having 1 to 12 carbon atoms, an alkoxy group having 1 to 12 carbon atoms, an alkylthio group having 1 to 12 carbon atoms, a cyano group, a halogen group, an acyl group having 1 to 8 carbon atoms, an acyloxy group having 1 to 8 carbon atoms, a hydroxy group, an alkoxycarbonyl group having 1 to 12 carbon atoms, a nitro group, an amino group, or a dialkylamino group containing two alkyl groups each having 1 to 8 carbon atoms. In addition, the aliphatic hydrocarbon group represented by R' described above is preferably an alicyclic compound the ring of which contains more than 3 members, or more preferably more than 5 members, or an alicyclic compound having a crosslinked structure. Of such groups, a cyclohexyl group, a cyclopentyl group, a norbornyl group, an adamantyl group, or the like is preferable. The alkyl group represented by R' described above is, for example, a 1-phenylethyl group.

In the present invention, part of the hydroxy groups or amino groups, other than the hydroxy groups or amino groups modified with molecules of the compound represented by the above general formula (I), is preferably modified with molecules of one or more kinds of compounds selected from the group consisting of phenyl isocyanate, tolyl isocyanate, naphthylethyl isocyanate, 3,5-dimethylphenyl isocyanate, 3,5-dichlorophenyl isocyanate, 4-chlorophenyl isocyanate, 1-phenylethyl isocyanate, and 4-methyl benzoyl chloride. Those groups are particularly preferably modified with molecules of 3,5-dimethylphenyl isocyanate, 3,5-dichlorophenyl isocyanate, 1-phenylethyl isocyanate, or 4-methyl benzoyl chloride.

The filler for optical isomer separation of the present invention is characterized in that the above polymer compound derivative is carried by the carrier through chemical bonding. The phrase "carried through chemical bonding" as used herein refers to a state where the polymer compound derivative is immobilized on the carrier through the chemical bond. At least one of a chemical bond between the polymer compound derivative and the carrier and a chemical bond between molecules of the polymer compound derivative is used in the immobilization of the polymer compound derivative through the chemical bond.

Examples of the above carrier include a porous organic carrier and a porous inorganic carrier; the porous inorganic carrier is preferable. A polymer substance composed of, for example, polystyrene, polyacrylamide, or polyacrylate is suitably used as the porous organic carrier, and silica, silica gel, alumina, magnesia, glass, kaolin, titanium oxide, a silicate, hydroxyapatite, zirconia, or the like is suitably used as the porous inorganic carrier. In addition, the morphology of the above porous inorganic carrier is not limited to a particulate carrier, and may be a network inorganic carrier like an organo-mineral complex, or a cylindrical, built-in inorganic carrier that can be held in a column tube, the carrier being described in, for example, Japanese Patent Application Laid-Open No. 2005-17268 or Japanese Patent Application Laid-Open No. 2006-150214.

Silica gel is a particularly preferable carrier, and the particles of silica gel each have a particle size of 1 μm to 100 μm, preferably 3 μm to 50 μm, or more preferably 3 μm to 30 μm, and have an average pore size of 1 nm to 4,000 nm, or preferably 3 nm to 500 nm. The surface of silica gel, which is desirably treated in order that an influence of remaining silanol may be eliminated, may not be treated at all.

<2> Method of Producing a Filler for Optical Isomer Separation of the Present Invention A method of producing a filler for optical isomer separation of the present invention includes the steps of: producing a polymer compound derivative obtained by modifying part of the hydroxy or amino groups of a polymer compound having the hydroxy or amino groups with molecules of a compound represented by the above general formula (I); and causing a carrier to carry the polymer compound derivative through chemical bonding.

<2-1> Step of Producing a Polymer Compound Derivative

The above polymer compound derivative can be produced by the following steps.

That is, the step of producing the polymer compound derivative to be used in the present invention includes at least a first modifying step of modifying the hydroxy or amino groups of the polymer compound having the hydroxy or amino groups, the polymer compound being dissolved, with molecules of a compound except the above compound represented by the general formula (I), and a second modifying step of modifying the hydroxy or amino groups of the above polymer compound which are not modified with the molecules of the compound except the above compound represented by the general formula (I) in the above first modifying step with the molecules of the above compound represented by the general formula (I).

The above first modifying step is preferably performed before the above second modifying step in order that the above compound represented by the general formula (I) may be efficiently and controllably introduced into the above polymer compound.

It should be noted that the above production method may further include a step of dissolving the polymer compound in order that a dissolved polymer compound having hydroxy or amino groups may be obtained. In the above dissolving step, a known method can be employed for dissolving the polymer compound; when the polymer compound to be dissolved is hardly soluble in a solvent or the like, the method preferably includes a step of swelling the polymer compound. In addition, when a dissolved polymer compound having hydroxy or amino groups is commercially available, it is possible to purchase and use the dissolved polymer compound having hydroxy or amino groups.

As a solvent for dissolving a polymer compound derivative in the above dissolving step, an amide-based solvent is preferably used. Examples of the solvent include a mixed solution such as a mixed solution of N,N-dimethyl acetamide and lithium chloride, N-methyl-2-pyrrolidone and lithium chloride, or 1,3-dimethyl-2-imidazolidinone and lithium chloride. A mixed solution of N,N-dimethyl acetamide and lithium chloride is particularly preferably used.

The above dissolving step is preferably performed under a nitrogen atmosphere. In addition, when the above polymer compound is a polysaccharide, the polysaccharide is dissolved under, for example, conditions including a temperature of 20 to 100° C. and a time period of 1 to 24 hours; one skilled in the art can appropriately adjust the conditions depending on the polymer compound to be used.

The above first modifying step is a step of modifying the hydroxy or amino groups of the polymer compound having the hydroxy or amino groups, the polymer compound being dissolved, with molecules of a compound having at least a functional group which acts on an optical isomer and a functional group which can react with a hydroxy or amino group (also simply referred to as "compound having the functional groups"). A known method can be employed in the modification. Although not limited to the following description, for example, the hydroxy or amino groups of the polymer compound are preferably modified with the molecules of the compound having the functional groups in an amount corresponding to 60 to 100 mol % of the hydroxy or amino groups of the polymer compound in a mixture of dimethylacetamide, lithium chloride, and pyridine at 80 to 100° C. for 1 to 24 hours under a nitrogen atmosphere in order that the ratio of introduction of the molecules of the compound having the functional groups may be controlled. In particular, the reaction temperature, the reaction time, and the amount in which the compound having the functional groups is added each play an important role in adjusting the ratio of introduction of the molecules of the above compound having the functional groups.

It should be noted that the positions at which the molecules of the compound having at least a functional group which acts on an optical isomer and a functional group which can react with a hydroxy or amino group are introduced in the polymer compound derivative in the present invention are not particularly limited.

The above second modifying step is a step of modifying unreacted hydroxy or amino groups of the polymer compound, the hydroxy or amino groups of which are not completely modified with the molecules of the compound having the functional groups in the above first modifying step, with the molecules of the above compound represented by the general formula (I). A known method can be employed in the modification. Although not limited to the following description, for example, the unreacted hydroxy or amino groups are preferably modified with the molecules of the above compound represented by the general formula (I) in an amount corresponding to 1 to 10 mol % of the hydroxy or amino groups before modification of the polymer compound in a mixture of dimethylacetamide, lithium chloride, and pyridine at 80 to 100° C. for 1 to 24 hours under a nitrogen atmosphere in order that the ratio of introduction of the molecules of the above compound represented by the general formula (I) may be controlled. Of those conditions, the amount in which the above compound represented by the general formula (I) is added plays a particularly important role in controlling the ratio of introduction of the molecules of the above compound represented by the general formula (I).

It should be noted that the positions at which the molecules of the above compound represented by the general formula (I) are introduced in the above polymer compound derivative are not particularly limited. When unreacted hydroxy or amino groups are present in the polymer compound derivative at the time of the completion of the above second modifying step, they are preferably caused to react with the molecules of the compound having the functional groups used in the first modifying step.

In addition, a method of producing the polymer compound derivative to be used in the present invention may be a method including at least: a protective group-introducing step of introducing a protective group into part of the hydroxy or amino groups of the polymer compound having the hydroxy or amino groups, the polymer compound being dissolved; a first modifying step of modifying the hydroxy or amino groups remaining in the polymer compound into which the protective group has been introduced with molecules of a compound except the above compound represented by the general formula (I); an eliminating step of eliminating the introduced protective group to regenerate hydroxy groups; and a second modifying step of modifying the regenerated hydroxy groups with the molecules of the above compound represented by the general formula (I). In the above production method including the protective group-introducing step and the eliminating step, the hydroxy or amino groups at specific positions of the polymer compound can be modified with the molecules of the above compound represented by the general formula (I).

In the above production method including the protective group-introducing step and the eliminating step, the protective group to be introduced in the protective group-introducing step is not particularly limited as long as the group can be eliminated from a hydroxy or amino group more easily than a modifying molecule with which a hydroxy or amino group is modified in each modifying step is. A compound for introducing the protective group can be determined on the basis of the reactivity of a hydroxy or amino group to be protected or modified and the reactivity of the compound with a hydroxy or amino group. The compound is, for example, a compound having a triphenylmethyl group (trityl group), a diphenylmethyl group, a tosyl group, a mesyl group, a trimethylsilyl group, or a dimethyl(t-butyl)silyl group, and a compound having a trityl group or a trimethylsilyl group is suitably used.

The introduction of the protective group into a hydroxy or amino group, and the modification of a hydroxy or amino group with a modifying compound described above can each be performed by a known proper reaction in accordance with the kind of a compound to be caused to react with a hydroxy or amino group. In addition, the elimination of the protective group from a hydroxy or amino group in the eliminating step can be performed by a known method such as hydrolysis with an acid or alkali without any particular limitation.

It should be noted that the employment of the method of producing the polymer compound derivative to be used in the present invention allows a predetermined amount of the hydroxy or amino groups of the polymer compound derivative not modified with the functional groups in the first modifying step to be modified with the molecules of the above compound represented by the general formula (I) in the second modifying step. Therefore, the ratio of introduction of the molecules of the compound represented by the general formula (I) into the polymer compound having hydroxy or amino groups can be controlled by adjusting the amount of the above compound represented by the general formula (I) in the second modifying step.

When the ratio of introduction of the molecules of the above compound represented by the general formula (I) in the polymer compound derivative to be used in the present invention is determined, each of the following two methods, each involving the use of $^1$H NMR, is preferably employed. When a reaction is complete, the ratios of introduction of the molecules of the above compound represented by the general formula (I) determined by the respective methods show an identical value. In the present invention, the following method (2) was employed.

(1) The ratio of introduction of the molecules of a compound except the above compound represented by the general formula (I) in the polymer compound derivative is determined from an elemental analysis value for the polymer compound derivative before the introduction of the above compound represented by the general formula (I). After that, the ratio of introduction of silyl groups in the polymer compound derivative into which the above compound represented by the general formula (I) has been introduced is calculated from a ratio of the polymer compound derivative between a proton of a functional group of the compound except the above compound represented by the general formula (I) and a proton of a functional group directly bonded to silicon of the above compound represented by the general formula (I), and the calculated value is defined as the ratio of introduction of the molecules of the above compound represented by the general formula (I) in the polymer compound derivative.

(2) After the completion of the modifying steps, a ratio between a proton of a functional group of the compound except the above compound represented by the general formula (I) and a proton of a functional group directly bonded to silicon of the above compound represented by the general formula (I) is determined on the assumption that the hydroxy or amino groups of the polymer compound derivative of the present invention are completely modified with modifying groups. Then, the ratio of introduction of the molecules of the above compound represented by the general formula (I) in the polymer compound derivative is calculated.

<2-2> Step of Causing a Carrier to Carry the Above Polymer Compound Derivative Through Chemical Bonding A known step can be employed in the step of causing a carrier such as silica gel to carry the above polymer compound derivative through chemical bonding; the step preferably includes a step of causing the above polymer compound derivative to adsorb physically to a carrier, such as silica gel, and a step of producing at least one of a chemical bond between the above polymer compound derivative physically adsorbed onto the above carrier and the carrier and a chemical bond between molecules of the above polymer compound derivative. In addition, in the step of producing at least one of a chemical bond between the polymer compound derivative physically adsorbed onto the carrier and the carrier and a chemical bond between molecules of the polymer compound derivative, for example, the polymer compound derivative into which the molecules of the above compound represented by the general formula (I) have been introduced at a ratio of 1 to 35% is preferably immobilized on the carrier, such as silica gel, in an acid aqueous solution having a pH of 1 to 6 at 20 to 150° C. for 1 minute to 24 hours with a mass ratio between the polymer compound derivative and the carrier set to 1:2 to 1:20 in terms of an improvement in ratio at which the polymer compound derivative is immobilized on the carrier (also referred to as "immobilization ratio"). Of those conditions, the reaction pH, the reaction temperature, and the reaction time are particularly important in terms of an improvement in the immobilization ratio.

In addition, the employment of the production method of the present invention can increase the above immobilization ratio to 99% or more. The above immobilization ratio is a numerical value obtained by multiplying a ratio of the mass of the polymer compound derivative present on the carrier on which the polymer compound derivative has been immobilized after washing with a solvent in which the polymer compound derivative is soluble to the mass of the polymer compound derivative present on the carrier by 100, and can be calculated from thermogravimetric analysis. In addition to the above conditions, for example, the ratio of introduction of the molecules of the above compound represented by the general formula (I) into the hydroxy or amino groups of the polymer compound having the hydroxy or amino groups is preferably controlled as described above in order that the immobilization ratio may be controlled.

Further, a reduction in optical resolution of the filler can be suppressed by the following procedure: after the polymer compound derivative has been immobilized on the carrier (here, silica gel), a remaining silanol group present on silica gel or an unreacted alkoxy group in the above compound represented by the general formula (I) introduced into the polymer compound derivative is transformed into a trialkylsiloxy group with a silane coupling agent such as chlorotrimethylsilane or chlorotriethylsilane at a proper temperature. In this case, when the above silane coupling agent generates an acid in an amount sufficient for the immobilization of the polymer compound derivative on the carrier, the above immobilization process under an acid condition may be omitted.

The filler for optical isomer separation of the present invention can be used also as a filler for a capillary column for gas chromatography or electrophoresis, or particularly capillary electrochromatography (CEC), capillary zone electrophoresis (CZE), or micellar electrokinetic chromatography (MEKC).

EXAMPLES

Hereinafter, the present invention will be described in more detail by way of examples. However, it goes without saying that the scope of the present invention is not limited to the examples. In addition, cellulose used in the following examples and the like is a microcrystalline cellulose, the particles of silica gel used in the examples and the like each have a pore size of 1,000 Å and a particle size of 7 μm, and aminopropyl-treated silica gel used in the examples and the like is also prepared by treating the surface of silica gel described above.

Example 1

(1) Synthesis of Cellulose 3,5-Dimethylphenylcarbamate Part of Hydroxy Groups of which Remain 300 ml of dehydrated N,N-dimethylacetamide and 25.0 g of lithium chloride were added to 10.0 g (61.8 mmol) of dried cellulose, and the mixture was swollen. After that, the resultant mixture was stirred so that cellulose was uniformly dissolved.

150 ml of pyridine and 29.4 g (200 mmol) of 3,5-dimethylphenyl isocyanate were added to the resultant dissolved product, and the mixture was subjected to a reaction at 90° C. for 26 hours. The reaction solution was dropped into methanol, and was recovered as insoluble matter. After that, the recovered matter was dried in a vacuum, whereby 27.9 g of a partially substituted cellulose 3,5-dimethylphenylcarbamate derivative A were obtained. The following analysis confirmed that the ratio of introduction of molecules of 3,5-dimethylphenyl isocyanate into the hydroxy groups of the resultant derivative was 89.7%.

(2) Synthesis of Cellulose 3,5-Dimethylphenylcarbamate Having Alkoxysilyl Groups 30 ml of pyridine and 1.34 g (5.42 mmol) of 3-isocyanatepropyltriethoxysilane were added to 2.00 g (3.59 mmol) of the dried derivative A, and the mixture was subjected to a reaction at 80° C. for 72 hours. The pyridine soluble portion was dropped to methanol, and was recovered as an insoluble portion. After that, the recovered portion was dried in a vacuum, whereby 2.04 g of a cellulose 3,5-dimethylphenylcarbamate derivative B into which alkoxysilyl groups had been introduced were obtained. $^1$H NMR results confirmed that the ratio of introduction of molecules of 3,5-dimethylphenyl isocyanate and the ratio of introduction of the alkoxysilyl groups were 89.7% and 10.3%, respectively (spectrum 1; see FIG. 3).

Figure 3:
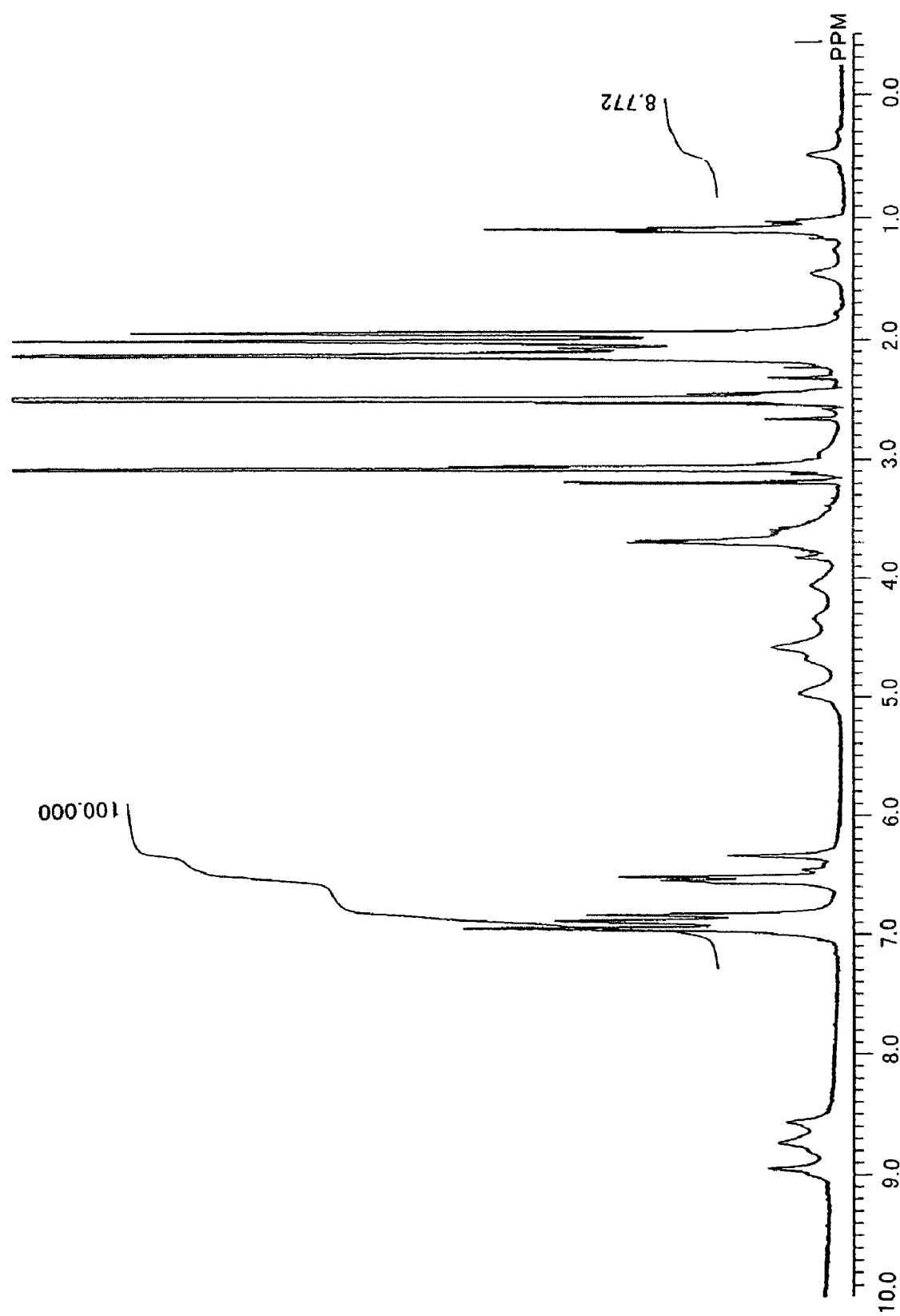
FIG. 3 is a view showing the $^1$H NMR spectrum (spectrum 1) of a cellulose 3,5-dimethylphenylcarbamate derivative B containing an alkoxysilyl group obtained in Example 1 in DMSO-$d_6$ at 80° C.

(3) Method of Measuring Each of the Ratio of Introduction of the Molecules of 3,5-Dimethylphenyl Isocyanate and the Ratio of Introduction of the Alkoxysilyl Groups Described Above The ratios were each determined from a $^1$H NMR spectrum (400 MHz, Gemini-2000 (Varian), in DMSO-$d_6$, 80° C.). The ratio of introduction of silyl groups in the polymer compound derivative was calculated from a ratio between a proton of the phenyl group of a 3,5-dimethylphenyl group of the cellulose derivative into which the silyl groups had been introduced and a methylene proton directly bonded to silicon of a 3-triethoxysilylpropyl group, and was defined as the ratio of introduction of molecules of 3-isocyanatepropyltriethoxysilane in the polymer compound derivative. FIG. 3 shows the $^1$H NMR spectrum of the derivative-B. The $^1$H NMR spectrum shows that a signal derived from the proton of the phenyl group appears at around 6.0 to 7.0 ppm and that a signal derived from the methylene proton bonded to a silyl group appears at around 0.5 ppm. Therefore, the $^1$H NMR results show that the ratio of introduction of the molecules of 3,5-dimethylphenyl isocyanate and the ratio of introduction of the molecules of 3-isocyanatepropyltriethoxysilane in the derivative-B are 89.7% and 10.3%, respectively.

(4) Preparation of a Silica Gel-Carried Filler 337 mg of the resultant derivative B were dissolved in 8 ml of tetrahydrofuran, and 1.35 g of aminopropyl-treated silica gel were caused to carry the derivative in the solution, whereby Silica B-1 was obtained. 0.65 g of Silica B-1 which had been dried was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative B on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative B had been immobilized was obtained. Silica gel thus obtained was washed with tetrahydrofuran, but no cellulose derivative was eluted. Silica gel after washing with tetrahydrofuran was defined as Silica B-2.

(5) Loading into a Column

Silica B-2 thus obtained was subjected to particle size fractionation, and was then loaded into a stainless steel column having a length of 25 cm and an inner diameter of 0.2 cm by a slurry method. The resultant column was defined as a column-1.

The column-1 had a number of theoretical plates (N) of 1,300.

(6) Evaluation for Optical Resolution

Figure 2:
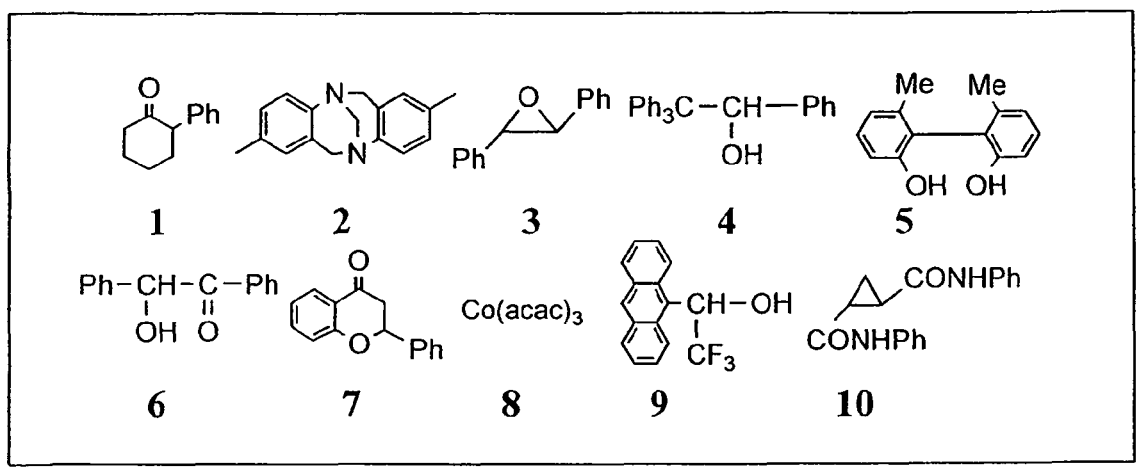
FIG. 2 is a view showing the structural formulae of compounds to be optically resolved in the examples and comparative examples in which numerical values described below the structural formulae correspond to numerical values representing the kinds of racemic bodies described in Tables 1 to 4.

The optical resolution of ten kinds of racemic bodies shown in FIG. 2 with the column obtained by the above operation (about 20° C.) was performed (PU-980, JASCO Corporation). The detection and identification of a peak were performed with a UV detector (UV-970, JASCO Corporation, 254 nm) and an optical rotation detector (OR-990, JASCO Corporation) under the following conditions: a mixture of hexane and 2-propanol at a ratio of 95:5 was used as an eluent, and its flow rate was 0.2 ml/min. It should be noted that the number of theoretical plates N was determined from the peak of benzene, and a time $t_0$ for which the eluent passed through the column was determined from the elution time of 1,3,5-tri-tert-butylbenzene.

It should be noted that conditions concerning, for example, HPLC and a detector used in the evaluation for optical resolution identical to those described above were used in the following examples and comparative examples unless otherwise stated. Table 1 shows the results of the optical resolution with the column-1. Values in the table are a capacity ratio k1' and a separation factor α, and a sign in parentheses represents the optical activity of an enantiomer which was previously eluted.

It should be noted that the capacity ratio k1' and the separation factor α are defined by the following formulae. A capacity ratio and a separation factor were calculated in the following examples and comparative examples by using the same formulae.

Num 1
Capacity ratio k1'

$$k1'=[(\text{retention time of enantiomer})-(t_0)]/t_0$$

Num 2
Separation factor α

$$\alpha=(\text{capacity ratio of enantiomer to be retained more strongly})/(\text{capacity ratio of enantiomer to be retained more weakly})$$

Table 1

TABLE 1

| | Column-1 | |
|---|---|---|
| Racemic body | k1' | α |
| 1 | 1.54(−) | 1.29 |
| 2 | 1.14(+) | 1.62 |
| 3 | 0.79(−) | 1.25 |
| 4 | 2.28(+) | 1.13 |
| 5 | 3.64(−) | 3.48 |
| 6 | 4.40(+) | 1.25 |
| 7 | 1.94(−) | 1.13 |
| 8 | 1.16(+) | 1.21 |
| 9 | 4.60(−) | 2.17 |
| 10 | 4.86 | 1.00 |

Eluent: hexane/2-propanol (95/5)
Column: 25 × 0.20 cm (i.d.)
Flow rate: 0.2 ml/min

Example 2

(1) Synthesis of Cellulose 3,5-Dimethylphenylcarbamate Part of Hydroxy Groups of which Remain 15 ml of pyridine and 84 mg (0.57 mmol) of 3,5-dimethylphenyl isocyanate were added to 1.00 g (1.79 mmol) of the above dried derivative A, and the mixture was subjected to a reaction at 80° C. for 12 hours. The pyridine soluble portion was dropped into methanol, and was recovered as an insoluble portion. After that, the recovered portion was dried in a vacuum, whereby 1.01 g of a partially substituted cellulose 3,5-dimethylphenylcarbamate derivative C were obtained. $^1$H NMR results confirmed that the ratio of introduction of molecules of 3,5-dimethylphenyl isocyanate into the hydroxy groups of the resultant derivative was 92.7%.

Figure 4:
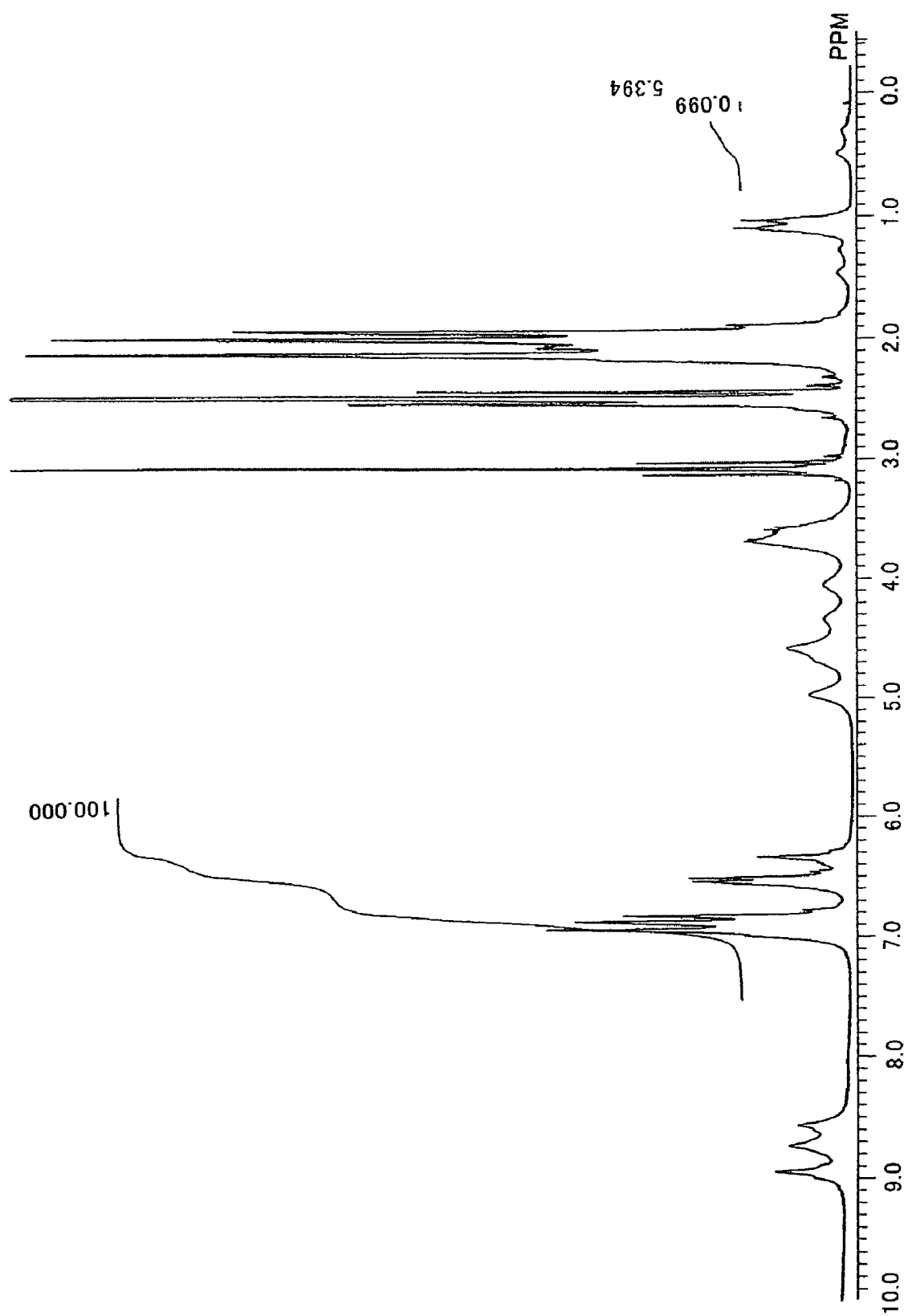
FIG. 4 is a view showing the $^1$H NMR spectrum (spectrum 2) of a cellulose 3,5-dimethylphenylcarbamate derivative D containing an alkoxysilyl group obtained in Example 2 in DMSO-$d_6$ at 80° C.

(2) Synthesis of Cellulose 3,5-Dimethylphenylcarbamate Having Alkoxysilyl Groups 15 ml of pyridine and 0.67 g (2.70 mmol) of 3-isocyanatepropyltriethoxysilane were added to 0.75 g (1.31 mmol) of the dried derivative C, and the mixture was subjected to a reaction at 90° C. for 36 hours. The pyridine-soluble portion was dropped into methanol, and was recovered as an insoluble portion. After that, the recovered portion was dried in a vacuum, whereby 0.71 g of a cellulose 3,5-dimethylphenylcarbamate derivative D into which alkoxysilyl groups had been introduced were obtained. $^1$H NMR results confirmed that the ratio of introduction of molecules of 3,5-dimethylphenyl isocyanate and the ratio of introduction of the alkoxysilyl groups were 92.7% and 7.3%, respectively (spectrum 2; see FIG. 4).

(3) Preparation of a Silica Gel-Carried Filler 350 mg of the resultant derivative D were dissolved in 8 ml of tetrahydrofuran, and 1.40 g of aminopropyl-treated silica gel were caused to carry the derivative in the solution, whereby Silica D-1 was obtained. 0.65 g of Silica D-1 which had been dried was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative D on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative D had been immobilized was obtained. Silica gel thus obtained was washed with tetrahydrofuran, but no cellulose derivative was eluted. Silica gel after washing with tetrahydrofuran was defined as Silica D-2.

(4) Loading into a Column

Silica D-2 thus obtained was subjected to particle size fractionation, and was then loaded into a stainless steel column having a length of 25 cm and an inner diameter of 0.2 cm by a slurry method. The resultant column was defined as a column-2.

The column-2 had a number of theoretical plates (N) of 1,800.

(5) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 2 shows the results of the optical resolution with the column-2. Values in the table are a capacity ratio k1' and a separation factor α, and a sign in parentheses represents the optical activity of an enantiomer which was previously eluted.

Example 3

(1) Synthesis of Cellulose 3,5-Dimethylphenylcarbamate Part of Hydroxy Groups of which Remain 300 ml of dehydrated N,N-dimethylacetamide and 25.2 g of lithium chloride were added to 10.0 g (61.8 mmol) of dried cellulose, and the mixture was swollen. After that, the resultant mixture was stirred so that cellulose was uniformly dissolved.

150 ml of pyridine and 24.0 g (163 mmol) of 3,5-dimethylphenyl isocyanate were added to the resultant dissolved product, and the mixture was subjected to a reaction at 80° C. for 12 hours. The reaction solution was dropped into methanol, and was recovered as insoluble matter. After that, the recovered matter was dried in a vacuum, whereby 23.8 g of a partially substituted cellulose 3,5-dimethylphenylcarbamate were obtained. 350 ml of pyridine and 4.56 g (31.0 mmol) of 3,5-dimethylphenyl isocyanate were added to 22.1 g of the cellulose derivative thus synthesized, and the mixture was subjected to a reaction at 80° C. for 18 hours. The pyridine-soluble portion was dropped into methanol, and was recovered as an insoluble portion. After that, the recovered portion was dried in a vacuum, whereby 22.5 g of a partially substituted cellulose 3,5-dimethylphenylcarbamate derivative E were obtained.

Figure 5:
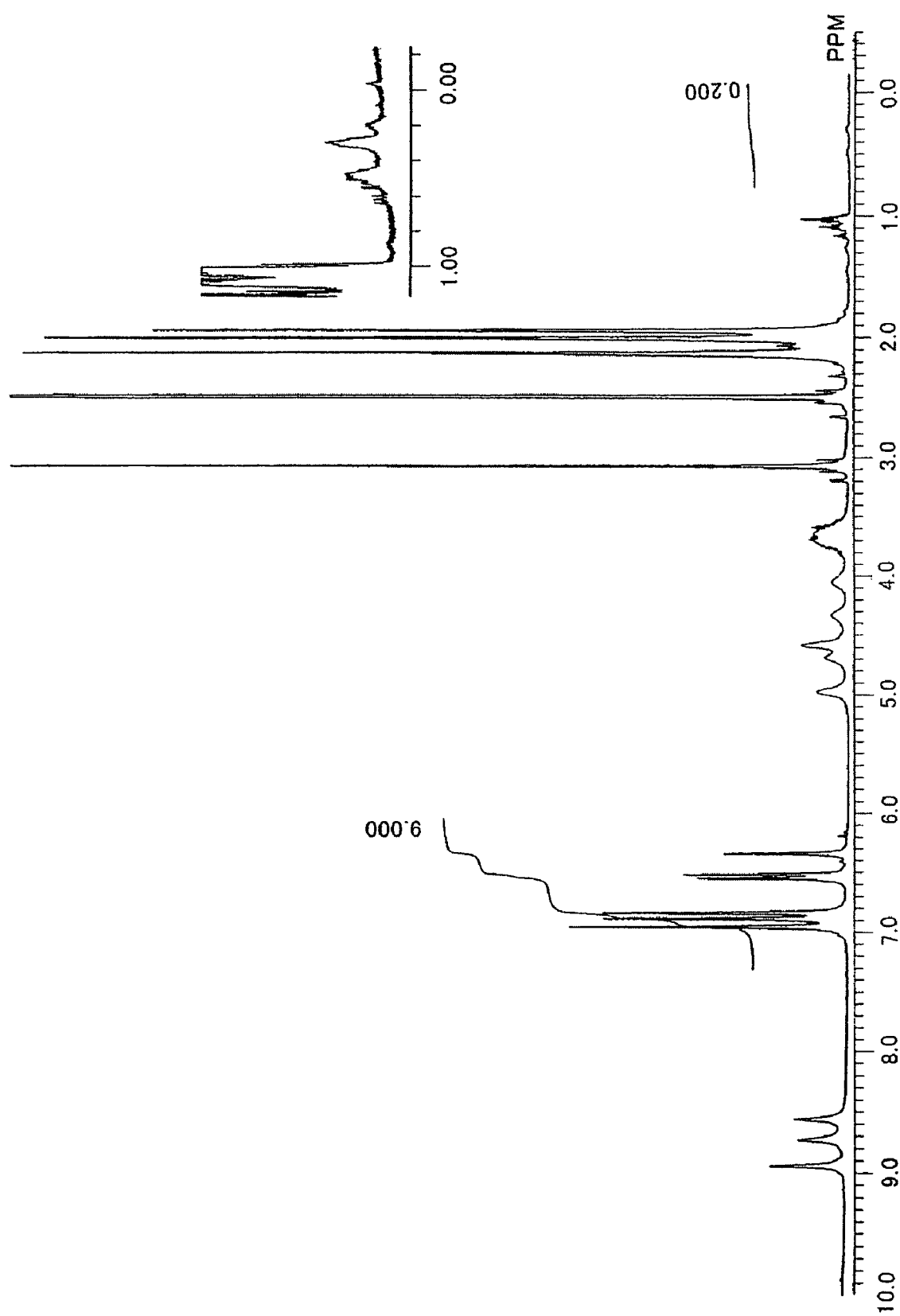
FIG. 5 is a view showing the $^1$H NMR spectrum (spectrum 3) of a cellulose 3,5-dimethylphenylcarbamate derivative F containing an alkoxysilyl group obtained in Example 3 in DMSO-$d_6$ at 80° C.

(2) Synthesis of Cellulose 3,5-Dimethylphenylcarbamate Having Alkoxysilyl Groups 15 ml of pyridine and 0.43 g (1.72 mmol) of 3-isocyanatepropyltriethoxysilane were added to 1.00 g of the dried derivative E, and the mixture was subjected to a reaction at 80° C. for 17 hours. Then, 0.25 g (1.70 mmol) of 3,5-dimethylphenyl isocyanate were added to the resultant mixture and the mixture was subjected to a reaction at 80° C. for 11 hours. The pyridine-soluble portion was dropped into methanol, and was recovered as an insoluble portion. After that, the recovered portion was dried in a vacuum, whereby 0.98 g of a cellulose 3,5-dimethylphenylcarbamate derivative F into which alkoxysilyl groups had been introduced were obtained. $^1$H NMR results confirmed that the ratio of introduction of molecules of 3,5-dimethylphenyl isocyanate and the ratio of introduction of the alkoxysilyl groups were 96.7% and 3.3%, respectively (spectrum 3; see FIG. 5).

(3) Preparation of a Silica Gel-Carried Filler 350 mg of the resultant derivative F were dissolved in 8 ml of tetrahydrofuran, and 1.40 g of aminopropyl-treated silica gel were caused to carry the derivative in the solution, whereby Silica F-1 was obtained. 0.65 g of Silica F-1 which had been dried was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative F on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative F had been immobilized was obtained. Silica gel thus obtained was washed with tetrahydrofuran. As a result, it was confirmed (by the thermogravimetric analysis (SSC-5200, Seiko Instruments Inc.) that 1% of the carried cellulose derivative was eluted, and the immobilization ratio was 99%. Silica gel after washing with tetrahydrofuran was defined as Silica F-2.

(4) Loading into a Column

Silica F-2 thus obtained was subjected to particle size fractionation, and was then loaded into a stainless steel column having a length of 25 cm and an inner diameter of 0.2 cm by a slurry method. The resultant column was defined as a column-3.

The column-3 had a number of theoretical plates (N) of 1,350.

(5) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 2 shows the results of the optical resolution with the column-3.

Example 4

(1) Preparation of a Silica Gel-Carried Filler 350 mg of the above derivative F were dissolved in 8 ml of tetrahydrofuran, and 1.40 g of untreated silica gel were caused to carry the derivative in the solution, whereby Silica F-3 was obtained. 0.65 g of Silica F-3 which had been dried was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative F on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative F had been immobilized was obtained. Silica gel thus obtained was washed with tetrahydrofuran. As a result, it was confirmed (by the above thermogravimetric analysis) that 2% of the carried cellulose derivative was eluted, and the immobilization ratio was 98%. Silica gel after washing with tetrahydrofuran was defined as Silica F-4.

(2) Loading into a Column

Silica F-4 thus obtained was subjected to particle size fractionation, and was then loaded into a stainless steel column having a length of 25 cm and an inner diameter of 0.2 cm by a slurry method. The resultant column was defined as a column-4. The column-4 had a number of theoretical plates (N) of 1,500.

(3) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 2 shows the results of the optical resolution with the column-4.

TABLE 2

| Racemic body | Column-2 | | Column-3 | | Column-4 |
| --- | --- | --- | --- | --- | --- |
| | k1' | α | k1' | α | k1' |
| 1 | 1.05 (−) | 1.29 | 0.93 (−) | 1.28 | 0.75 (−) |
| 2 | 0.79 (+) | 1.64 | 0.68 (+) | 1.60 | 0.67 (+) |
| 3 | 0.59 (−) | 1.27 | 0.54 (−) | 1.54 | 0.45 (−) |
| 4 | 1.35 (+) | 1.12 | 1.11 (+) | 1.18 | 0.91 (+) |
| 5 | 1.65 (−) | 4.15 | 1.39 (−) | 4.48 | 1.03 (−) |
| 6 | 2.28 (+) | 1.23 | 2.11 (+) | 1.34 | 1.58 (+) |
| 7 | 1.18 (−) | 1.16 | 1.12 (−) | 1.22 | 0.88 (−) |
| 8 | 0.54 (+) | 1.16 | 0.46 (+) | ~1 | 0.47 (+) |
| 9 | 1.77 (−) | 2.01 | 1.37 (−) | 2.39 | 1.01 (−) |
| 10 | 1.41 (+) | 1.23 | 1.03 (+) | 1.56 | 0.75 (+) |

Eluent: hexane/2-propanol (90/10)
Column: 25 × 0.20 cm (i.d.), Flow rate: 0.1 ml/min Example 5

(1) Synthesis of Amylose 3,5-Dimethylphenylcarbamate Having Alkoxysilyl Groups 45 ml of dehydrated N,N-dimethylacetamide and 3.00 g of lithium chloride were added to 1.50 g (9.26 mmol) of dried amylose, and the mixture was swollen. After that, the resultant mixture was stirred so that amylose was uniformly dissolved.

Figure 6:
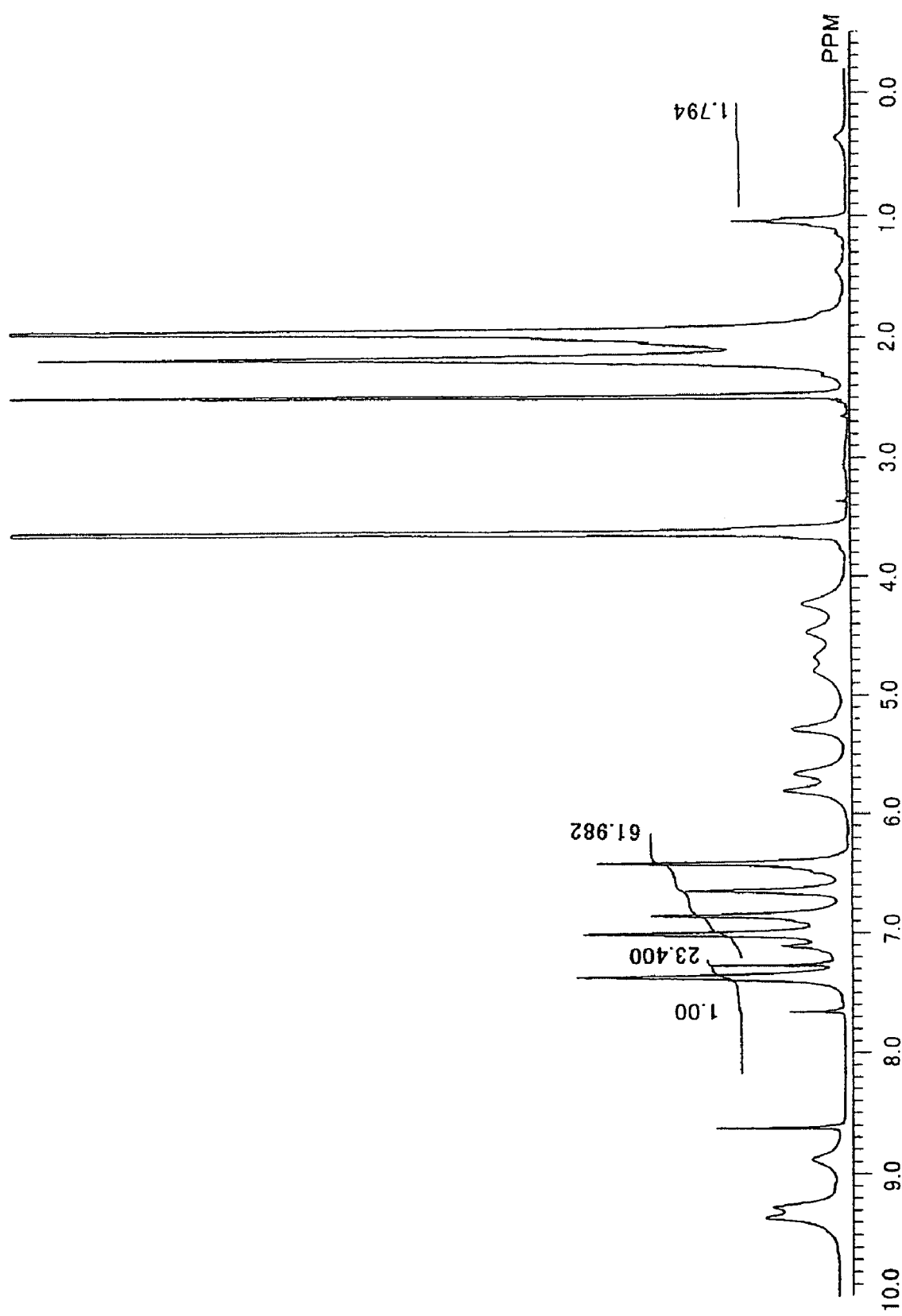
FIG. 6 is a view showing the $^1$H NMR spectrum (spectrum 4) of a cellulose 3,5-dimethylphenylcarbamate derivative G containing an alkoxysilyl group obtained in Example 5 in DMSO-$d_6$ at 80° C.

22.5 ml of pyridine and 3.40 g (23.1 mmol) of 3,5-dimethylphenyl isocyanate were added to the resultant dissolved product, and the mixture was subjected to a reaction at 80° C. for 6 hours. After that, 0.25 g (1.0 mmol) of 3-isocyanatepropyltriethoxysilane was added to the resultant mixture, and the mixture was subjected to a reaction at 80° C. for 13 hours. Further, 3.08 g (20.9 mmol) of 3,5-dimethylphenyl isocyanate were added to the resultant mixture, and the mixture was subjected to a reaction at 80° C. for 10 hours. The pyridine-soluble portion was dropped into methanol, and was recovered as an insoluble portion. After that, the recovered portion was dried in a vacuum, whereby 5.34 g of an amylose 3,5-dimethylphenylcarbamate derivative G into which alkoxysilyl groups had been introduced were obtained. $^1$H NMR results confirmed that the ratio of introduction of molecules of 3,5-dimethylphenyl isocyanate and the ratio of introduction of the alkoxysilyl groups were 97.0% and 3.0%, respectively (spectrum 4; see FIG. 6).

(2) Preparation of a Silica Gel-Carried Filler 350 mg of the resultant derivative G were dissolved in 8 ml of tetrahydrofuran, and 1.40 g of untreated silica gel were caused to carry the derivative in the solution, whereby Silica G-1 was obtained. 0.65 g of Silica G-1 which had been dried was dispersed in a mixture of ethanol; water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative G on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative G had been immobilized was obtained. Silica gel thus obtained was washed with tetrahydrofuran. As a result, it was confirmed (by the above thermogravimetric analysis) that less than 1% of the carried cellulose derivative was eluted, and the immobilization ratio was 99% or more. Silica gel after washing with tetrahydrofuran was defined as Silica G-2.

(3) Loading into a Column

Silica G-2 thus obtained was subjected to particle size fractionation, and was then loaded into a stainless steel column having a length of 25 cm and an inner diameter of 0.2 cm by a slurry method. The resultant column was defined as a column-5. The column-5 had a number of theoretical plates (N) of 1,500.

(4) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 3 shows the results of the optical resolution with the column-5. Values in the table are a capacity ratio k1' and a separation factor α, and a sign in parentheses represents the optical activity of an enantiomer which was previously eluted.

Example 6

(1) Synthesis of Cellulose 3,5-Dimethylphenylcarbamate Having Alkoxysilyl Groups 15 ml of dehydrated N,N-dimethylacetamide and 1.0 g of lithium chloride were added to 0.50 g (3.09 mmol) of dried cellulose, and the mixture was swollen. After that, the resultant mixture was stirred so that cellulose was uniformly dissolved.

Figure 7:
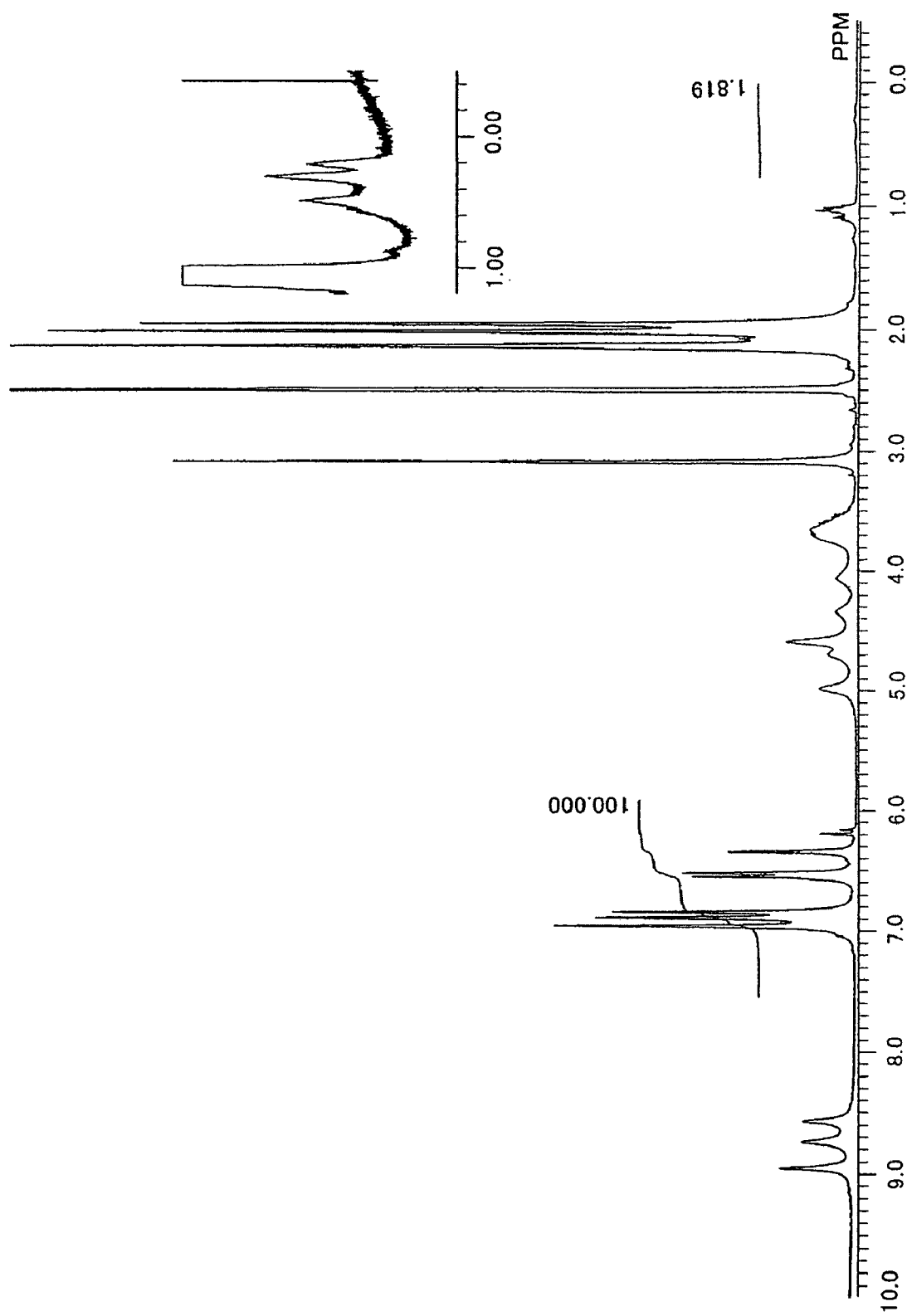
FIG. 7 is a view showing the $^1$H NMR spectrum (spectrum 5) of a cellulose 3,5-dimethylphenylcarbamate derivative H containing an alkoxysilyl group obtained in Example 6 in DMSO-$d_6$ at 80° C.

7.5 ml of pyridine and 1.13 g (7.69 mmol) of 3,5-dimethylphenyl isocyanate were added to the resultant dissolved product, and the mixture was subjected to a reaction at 80° C. for 6 hours. After that, 84 mg (0.34 mmol) of 3-isocyanatepropyltriethoxysilane was added to the resultant mixture, and the mixture was subjected to a reaction at 80° C. for 16 hours. Further, 1.13 g (7.69 mmol) of 3,5-dimethylphenyl isocyanate were added to the resultant mixture, and the mixture was subjected to a reaction at 80° C. for 7 hours. The pyridine-soluble portion was dropped into methanol, and was recovered as an insoluble portion. After that, the recovered portion was dried in a vacuum, whereby 1.58 g of a cellulose 3,5-dimethylphenylcarbamate derivative H into which alkoxysilyl groups had been introduced were obtained. $^1$H NMR results confirmed that the ratio of introduction of molecules of 3,5-dimethylphenyl isocyanate and the ratio of introduction of the alkoxysilyl groups were 97.3% and 2.7%, respectively (spectrum 5; see FIG. 7).

(2) Preparation of a Silica Gel-Carried Filler 350 mg of the resultant derivative H were dissolved in 8 ml of tetrahydrofuran, and 1.40 g of untreated silica gel were caused to carry the derivative in the solution, whereby Silica H-1 was obtained. 0.65 g of Silica H-1 which had been dried was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative H on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative H had been immobilized was obtained. Silica gel thus obtained was washed with tetrahydrofuran. As a result, it was confirmed (by the above thermogravimetric analysis) that 4% of the carried cellulose derivative was eluted, and the immobilization ratio was 96%. Silica gel after washing with tetrahydrofuran was defined as Silica H-2.

(3) Loading into a Column

Silica H-2 thus obtained was subjected to particle size fractionation, and was then loaded into a stainless steel column having a length of 25 cm and an inner diameter of 0.2 cm by a slurry method. The resultant column was defined as a column-6. The column-6 had a number of theoretical plates (N) of 1,700.

(4) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 3 shows the results of the optical resolution with the column-6.

Example 7

(1) Synthesis of Cellulose 3,5-Dimethylphenylcarbamate Having Alkoxysilyl Groups 15 ml of dehydrated N,N-dimethylacetamide and 1.0 g of lithium chloride were added to 0.50 g (3.1 mmol) of dried cellulose, and the mixture was swollen. After that, the resultant mixture was stirred so that cellulose was uniformly dissolved.

Figure 8:
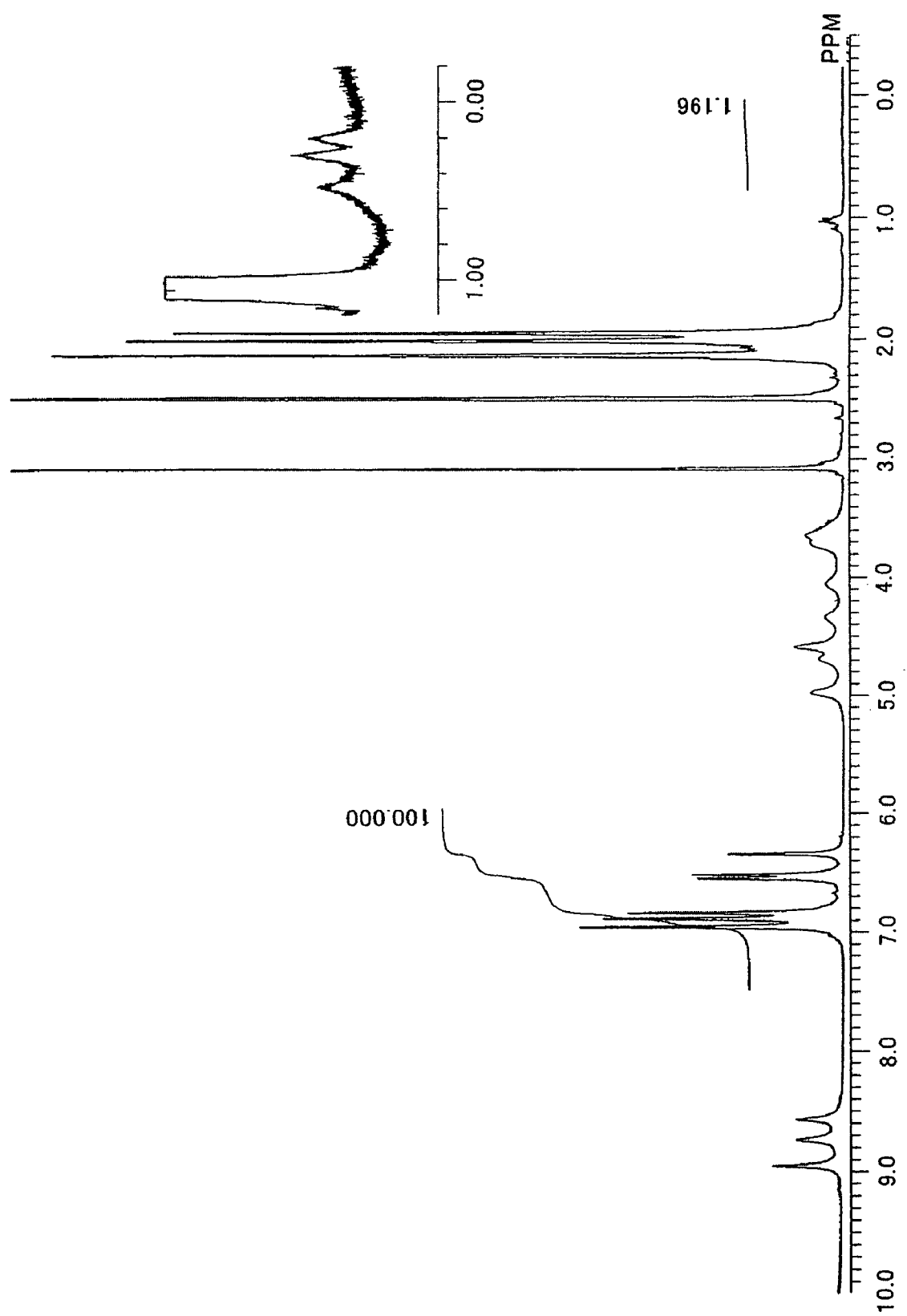
FIG. 8 is a view showing the $^1$H NMR spectrum (spectrum 6) of a cellulose 3,5-dimethylphenylcarbamate derivative I containing an alkoxysilyl group obtained in Example 7 in DMSO-$d_6$ at 80° C.

7.5 ml of pyridine and 1.13 g (7.69 mmol) of 3,5-dimethylphenyl isocyanate were added to the resultant dissolved product, and the mixture was subjected to a reaction at 80° C. for 6 hours. After that, 54 mg (0.22 mmol) of 3-isocyanatepropyltriethoxysilane was added to the resultant mixture, and the mixture was subjected to a reaction at 80° C. for 16 hours. Further, 1.13 g (7.69 mmol) of 3,5-dimethylphenyl isocyanate were added to the resultant mixture, and the mixture was subjected to a reaction at 80° C. for 7 hours. The pyridine-soluble portion was dropped into methanol, and was recovered as an insoluble portion. After that, the recovered portion was dried in a vacuum, whereby 1.69 g of a cellulose 3,5-dimethylphenylcarbamate derivative I into which alkoxysilyl groups had been introduced were obtained. $^1$H NMR results confirmed that the ratio of introduction of molecules of 3,5-dimethylphenyl isocyanate and the ratio of introduction of the alkoxysilyl groups were 98.3% and 1.7%, respectively (spectrum 6; see FIG. 8).

(2) Preparation of a Silica Gel-Carried Filler 350 mg of the resultant derivative I were dissolved in 8 ml of tetrahydrofuran, and 1.40 g of untreated silica gel were caused to carry the derivative in the solution, whereby Silica I-1 was obtained. 0.65 g of Silica H-1 which had been dried was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative I on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative I had been immobilized was obtained. Silica gel thus obtained was washed with tetrahydrofuran. As a result, it was confirmed (by the thermogravimetric analysis) that 9% of the carried cellulose derivative was eluted, and the immobilization ratio was 91%. Silica gel after washing with tetrahydrofuran was defined as Silica I-2.

(3) Loading into a Column

Silica I-2 thus obtained was subjected to particle size fractionation, and was then loaded into a stainless steel column having a length of 25 cm and an inner diameter of 0.2 cm by a slurry method. The resultant column was defined as a column-7. The column-7 had a number of theoretical plates (N) of 2,100.

(4) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 3 shows the results of the optical resolution with the column-7.

TABLE 3

| | Column-5 | | Column-6 | | Column-7 | |
|---|---|---|---|---|---|---|
| Racemic body | k1' | α | k1' | α | k1' | α |
| 1 | 0.63(−) | ~1 | 0.99(−) | 1.29 | 0.92(−) | 1.27 |
| 2 | 0.68(+) | 1.40 | 0.79(+) | 1.59 | 0.77(+) | 1.56 |
| 3 | 0.40(+) | 2.48 | 0.58(−) | 1.36 | 0.54(−) | 1.64 |
| 4 | 1.89(+) | 1.95 | 1.18(+) | 1.18 | 1.11(+) | 1.20 |
| 5 | 1.96(−) | 2.22 | 1.34(−) | 4.68 | 1.18(−) | 4.24 |
| 6 | 2.98(−) | 1.12 | 2.07(+) | 1.29 | 1.80(+) | 1.37 |
| 7 | 0.98(+) | 1.12 | 1.18(−) | 1.18 | 1.02(−) | 1.25 |
| 8 | 0.45 | 1.0 | 0.58(+) | 1.08 | 0.52(−) | ~1 |
| 9 | 1.13 | 1.0 | 0.37(−) | 2.26 | 1.28(−) | 2.43 |
| 10 | 3.93(+) | 3.70 | 1.03(+) | 1.45 | 0.79(+) | 1.67 |

Eluent: hexane/2-propanol (90/10)
Column: 25 × 0.20 cm (i.d.),
Flow rate: 0.1 ml/min Example 8

(1) Preparation of a Silica Gel-Immobilized Filler 350 mg of the above derivative I were dissolved in 8 ml of tetrahydrofuran, and 1.40 g of aminopropyl-treated silica gel were caused to carry the derivative in the solution, whereby Silica I-3 was obtained. 0.65 g of Silica I-3 which had been dried was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative I on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative I had been immobilized was obtained. Silica gel thus obtained was washed with tetrahydrofuran. As a result, it was confirmed (by the above thermogravimetric analysis) that 13% of the carried cellulose derivative was eluted, and the immobilization ratio was 87%. Silica gel after washing with tetrahydrofuran was defined as Silica I-4.

Comparison between Example 7 and Example 8 shows that, when the derivative I is used, the immobilization of the derivative is nearly unaffected by whether the used carrier is untreated silica gel or silica gel turned into 3-aminopropyl (the immobilization ratio is 91% in the former case or 87% in the latter case). In addition, comparison between the immobilization ratios of Examples 3 and 4 shows that there is no difference in immobilization ratio between untreated silica gel and silica gel turned into 3-aminopropyl. Those results show that the immobilization is nearly unaffected by a silanol group on the surface of silica gel, and occurs by virtue of a crosslinking reaction between molecules of a polysaccharide derivative.

(2) Loading into a Column

Silica I-4 thus obtained was subjected to particle size fractionation, and was then loaded into a stainless steel column having a length of 25 cm and an inner diameter of 0.2 cm by a slurry method. The resultant column was defined as a column-8. The column-8 had a number of theoretical plates (N) of 2,500.

(3) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 4 shows the results of the optical resolution with the column-8. Values in the table are a capacity ratio k1' and a separation factor α, and a sign in parentheses represents the optical activity of an enantiomer which was previously eluted.

Example 9

(1) Synthesis of Cellulose 3,5-Dimethylphenylcarbamate Having Alkoxysilyl Groups 30 ml of dehydrated N,N-dimethylacetamide and 2.0 g of lithium chloride were added to 1.00 g (6.17 mmol) of dried cellulose, and the mixture was swollen. After that, the resultant mixture was stirred so that cellulose was uniformly dissolved.

Figure 9:
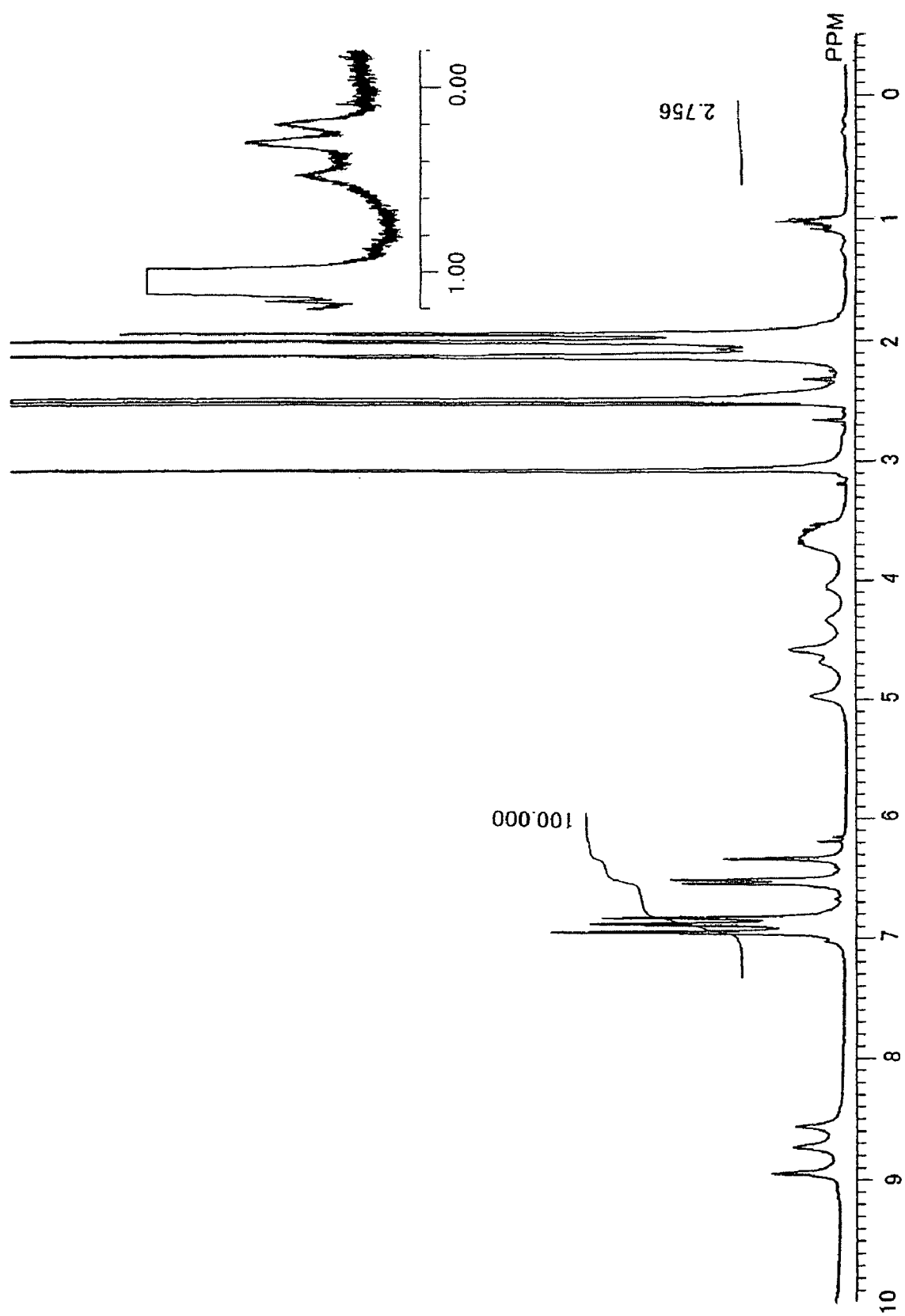
FIG. 9 is a view showing the $^1$H NMR spectrum (spectrum 7) of a cellulose 3,5-dimethylphenylcarbamate derivative J containing an alkoxysilyl group obtained in Example 9 in DMSO-$d_6$ at 80° C.

15 ml of pyridine and 2.30 g (15.6 mmol) of 3,5-dimethylphenyl isocyanate were added to the resultant dissolved product, and the mixture was subjected to a reaction at 80° C. for 6 hours. After that, 198 mg (0.80 mmol) of 3-isocyanatepropyltriethoxysilane was added to the resultant mixture, and the mixture was subjected to a reaction at 80° C. for 16 hours. Further, 2.30 g (15.6 mmol) of 3,5-dimethylphenyl isocyanate were added to the resultant mixture, and the mixture was subjected to a reaction at 80° C. for 7 hours. The pyridine-soluble portion was dropped into methanol, and was recovered as an insoluble portion. After that, the recovered portion was dried in a vacuum, whereby 3.28 g of a cellulose 3,5-dimethylphenylcarbamate derivative J into which alkoxysilyl groups had been introduced were obtained. $^1$H NMR results confirmed that the ratio of introduction of molecules of 3,5-dimethylphenyl isocyanate and the ratio of introduction of the alkoxysilyl groups were 96.0% and 4.0%, respectively (spectrum 7; see FIG. 9).

(2) Preparation of a Silica Gel-Immobilized Filler 350 mg of the resultant derivative J were dissolved in 8 ml of tetrahydrofuran, and 1.40 g of untreated silica gel were caused to carry the derivative in the solution, whereby Silica J-1 was obtained. 0.65 g of Silica J-1 which had been dried was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative J on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative J had been immobilized was obtained. Silica gel thus obtained was washed with tetrahydrofuran. As a result, it was confirmed (by the above thermogravimetric analysis) that the proportion of the organic substance present on silica gel before and after washing with THF were 18.7% and 18.6% respectively, 1% of the carried cellulose derivative was eluted, and the immobilization ratio was 99%. Silica gel after washing with tetrahydrofuran was defined as Silica J-2.

(3) Loading into a Column

Silica J-2 thus obtained was subjected to particle size fractionation, and was then loaded into a stainless steel column having a length of 25 cm and an inner diameter of 0.2 cm by a slurry method. The resultant column was defined as a column-9. The column-9 had a number of theoretical plates (N) of 1,600.

(4) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 4 shows the results of the optical resolution with the column-9.

Example 10

(1) Synthesis of Cellulose 3,5-Dimethylphenylcarbamate with Hydroxy Groups Remaining at Part of its 6-Positions 300 ml of dehydrated N,N-dimethylacetamide and 18.1 g of lithium chloride were added to 10.0 g (61.7 mmol) of dried cellulose, and the mixture was swollen. After that, the resultant mixture was stirred so that cellulose was uniformly dissolved. 150 ml of pyridine and 5.20 g (18.7 mmol) of trityl chloride were added to the resultant dissolved product, and the mixture was subjected to a reaction at 80° C. for 24 hours. After that, 37.0 g (252 mmol) of 3,5-dimethylphenyl isocyanate were added to the reaction solution, and the mixture was subjected to a reaction at 80° C. for 24 hours. The reaction solution was dropped into methanol, and the resultant insoluble portion was stirred in 1,000 ml of a 1% solution of HCl in methanol for 24 hours. Thus, deprotection was performed so that substituents at 6-positions were returned to hydroxy groups. The resultant mixture was washed with methanol, and was then dried in a vacuum, whereby 30.0 g (51.5 mmol) of a derivative K with hydroxy groups remaining at part of its 6-positions were obtained. $^1$H NMR results confirmed that the ratio of introduction of molecules of 3,5-dimethylphenyl isocyanate into the hydroxy groups of the resultant derivative was 95.3%.

Figure 10:
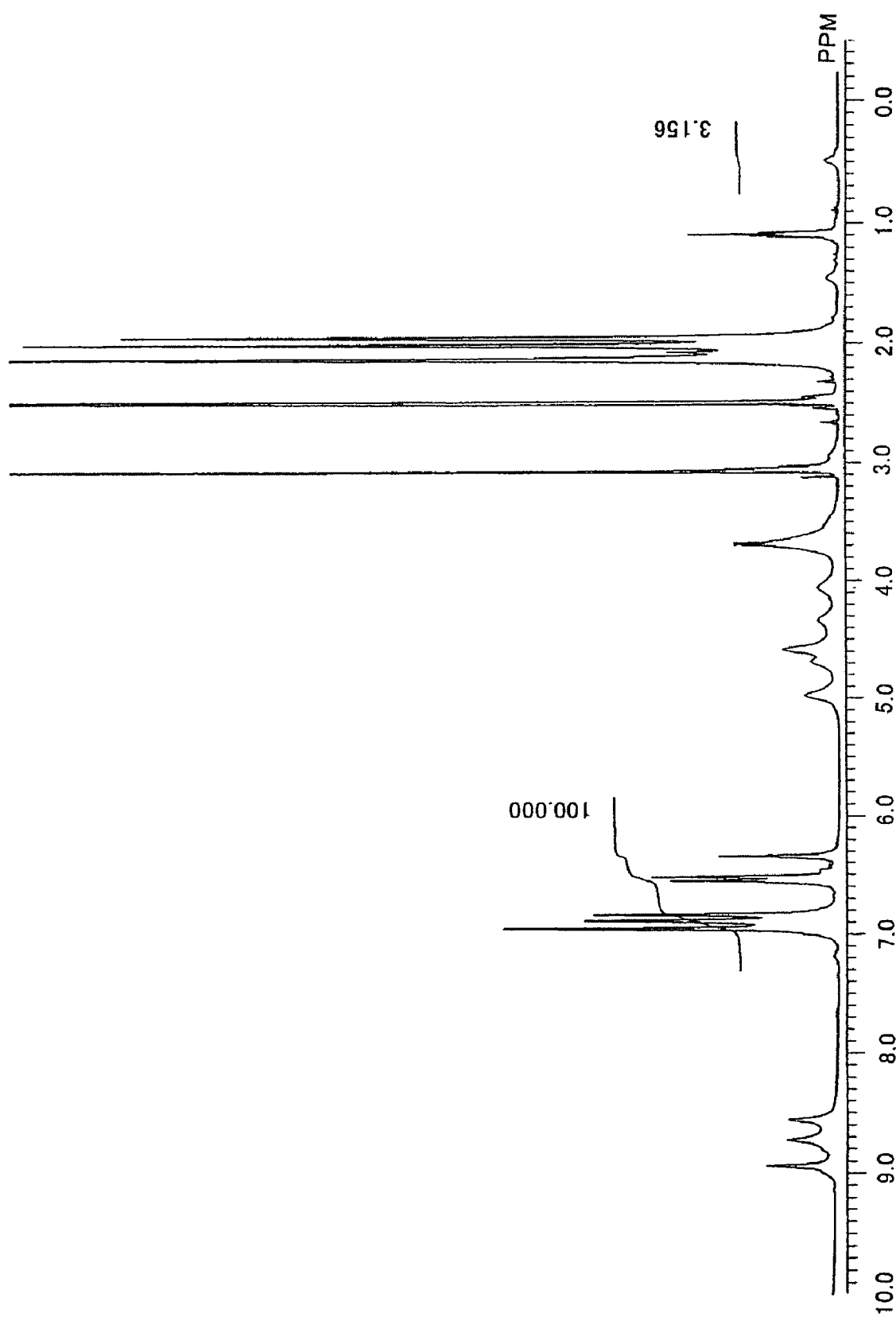
FIG. 10 is a view showing the $^1$H NMR spectrum (spectrum 8) of a cellulose 3,5-dimethylphenylcarbamate derivative L containing an alkoxysilyl group obtained in Example 10 in DMSO-$d_6$ at 80° C.

(2) Synthesis of Cellulose 3,5-Dimethylphenylcarbamate Having Alkoxysilyl Groups 100 ml of pyridine and 4.71 g (19.1 mmol) of 3-isocyanatepropyltriethoxysilane were added to 10.0 g (17.2 mmol) of the dried derivative K, and the mixture was subjected to a reaction at 85° C. for 24 hours. The pyridine-soluble portion was dropped into methanol, and was recovered as an insoluble portion. After that, the recovered portion was dried in a vacuum, whereby 5.18 g of a cellulose 3,5-dimethylphenylcarbamate derivative L into which alkoxysilyl groups had been introduced were obtained. $^1$H NMR results confirmed that the ratio of introduction of molecules of 3,5-dimethylphenyl isocyanate and the ratio of introduction of the alkoxysilyl groups were 95.3% and 4.7%, respectively (spectrum 8; see FIG. 10).

(3) Preparation of a Silica Gel-Immobilized Filler 350 mg of the resultant derivative L were dissolved in 8 ml of tetrahydrofuran, and 1.40 g of untreated silica gel were caused to carry the derivative in the solution, whereby Silica L-1 was obtained. 0.65 g of Silica L-1 which had been dried was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative L on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative L had been immobilized was obtained. Silica gel thus obtained was washed with tetrahydrofuran. As a result, it was confirmed (by the above thermogravimetric analysis) that 1% of the carried cellulose derivative was eluted, and the immobilization ratio was 990. Silica gel after washing with tetrahydrofuran was defined as Silica L-2.

(4) Loading into a Column

Silica L-2 thus obtained was subjected to particle size fractionation, and was then loaded into a stainless steel column having a length of 25 cm and an inner diameter of 0.2 cm by a slurry method. The resultant column was defined as a column-10. The column-10 had a number of theoretical plates (N) of 1,700.

(5) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 4 shows the results of the optical resolution with the column-10.

TABLE 4

| Racemic body | Column-8 | | Column-9 | | Column-10 | |
|---|---|---|---|---|---|---|
| | k1' | α | k1' | α | k1' | α |
| 1 | 0.90(−) | 1.27 | 1.06(−) | 1.29 | 1.09(−) | 1.31 |
| 2 | 0.68(+) | 1.57 | 0.85(+) | 1.58 | 0.86(+) | 1.63 |
| 3 | 0.54(−) | 1.62 | 0.58(−) | 1.27 | 0.61(−) | 1.10 |
| 4 | 1.06(+) | 1.21 | 1.29(+) | 1.17 | 1.33(+) | 1.14 |
| 5 | 1.34(−) | 3.96 | 1.42(−) | 4.10 | 1.51(−) | 4.83 |
| 6 | 1.95(+) | 1.34 | 2.40(+) | 1.25 | 2.51(+) | 1.24 |
| 7 | 1.05(−) | 1.24 | 1.34(−) | 1.14 | 1.34(−) | 1.15 |
| 8 | 0.39(+) | 1.12 | 0.63(+) | 1.12 | 0.63(+) | 1.22 |
| 9 | 1.34(−) | 2.44 | 1.57(−) | 2.06 | 1.62(−) | 2.05 |
| 10 | 0.95(+) | 1.69 | 1.24(+) | 1.23 | 1.47(+) | ~1 |

Eluent: hexane/2-propanol (90/10)
Column: 25 × 0.20 cm (i.d.),
Flow rate: 0.1 ml/min

Test Example 1

(1) Analysis of a Silica Gel-Immobilized Filler

Figure 11:
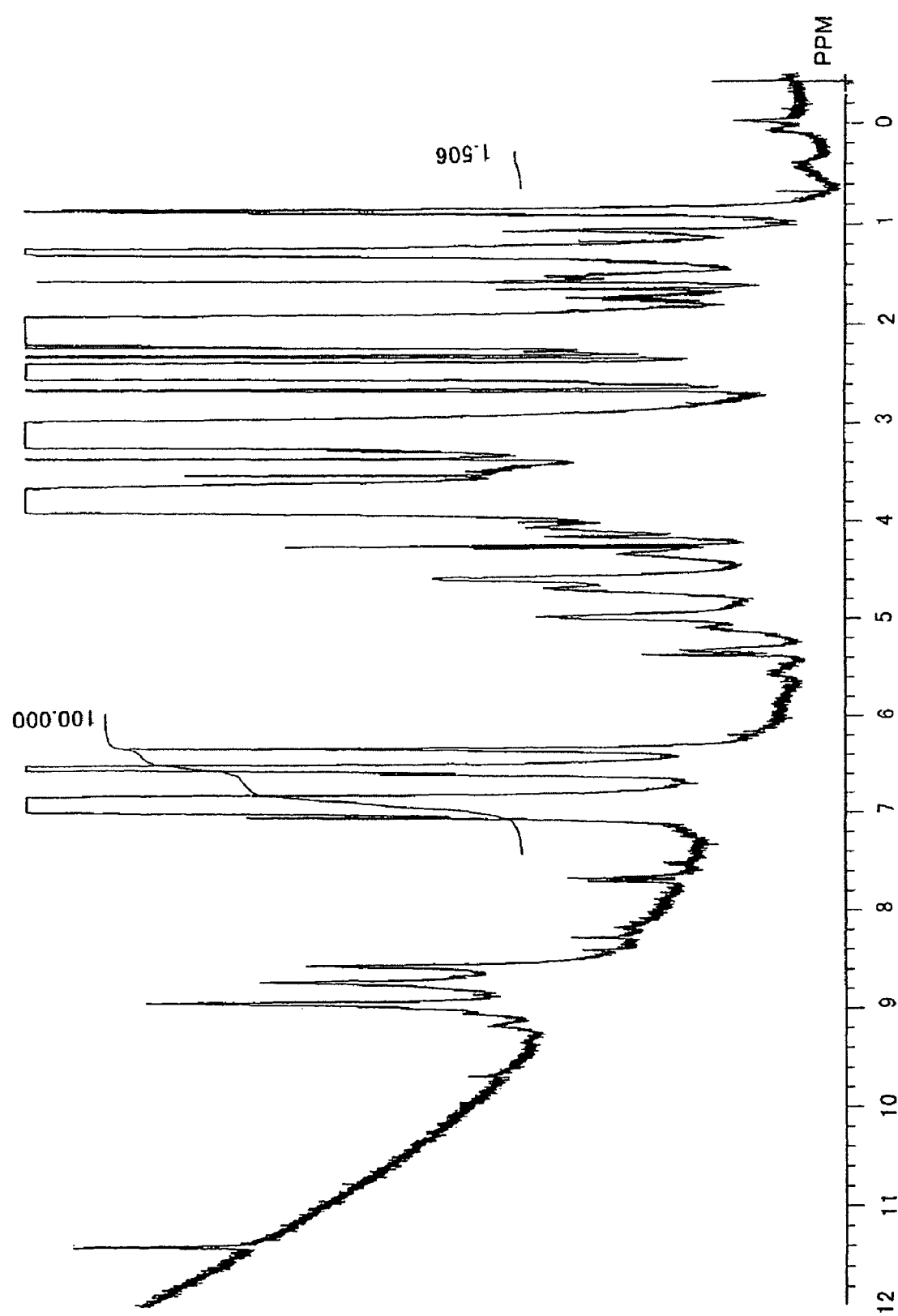
FIG. 11 is a view showing the $^1$H NMR spectrum (spectrum 9) of a Silica L-2 obtained in Test Example 1 (1) in DMSO-$d_6$ at 80° C.
Figure 12:
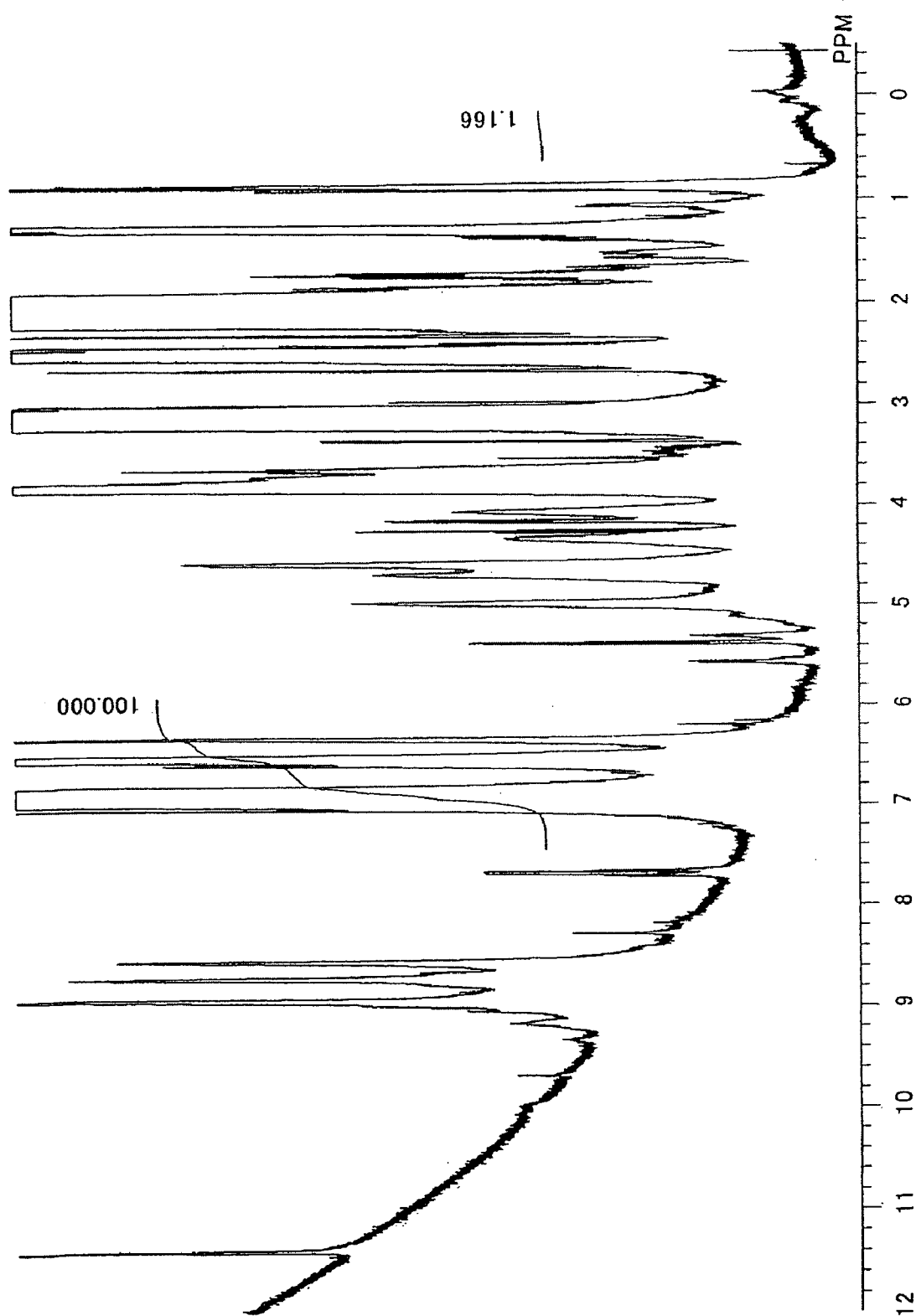
FIG. 12 is a view showing the $^1$H NMR spectrum (spectrum 10) of a Silica H-2 obtained in Test Example 1 (1) in DMSO-$d_6$ at 80° C.

Silica L-2 on which the derivative L having a 3-triethoxysilylpropyl group at its 6-position selectively had been immobilized (Example 10) and Silica H-2 on which the derivative H having 3-triethoxysilylpropyl groups at its 2, 3, and 6-positions non-specifically (Example 6) had been immobilized were each ground with a mortar, and the finely pulverized products were each washed with THF. The THF soluble portion was recovered from each washed liquid thus obtained, and was subjected to $^1$H NMR measurement. FIG. 11 shows the $^1$H NMR spectrum of the THF soluble portion of the ground product of Silica L-2 (spectrum 9), and FIG. 12 shows the $^1$H NMR spectrum of the THF soluble portion of the ground product of Silica H-2 (spectrum 10). The confirmation of the elution of each of the derivative L and the derivative H was attained, and a methylene proton adjacent to silicon was observed at 0.3 to 0.6 ppm in the spectrum 9 while a methylene proton adjacent to silicon was observed as a broad peak at 0.1 to 0.6 ppm in the spectrum 10. The difference resulted from a difference in position at which a 3-triethoxysilylpropyl group was introduced. Accordingly, a silica gel-immobilized filler prepared by using a derivative into which a 3-triethoxysilylpropyl group has been introduced regioselectively and a silica gel-immobilized filler prepared without using the derivative can be easily distinguished from each other.

(2) Analysis of Silica Gel

Figure 13:
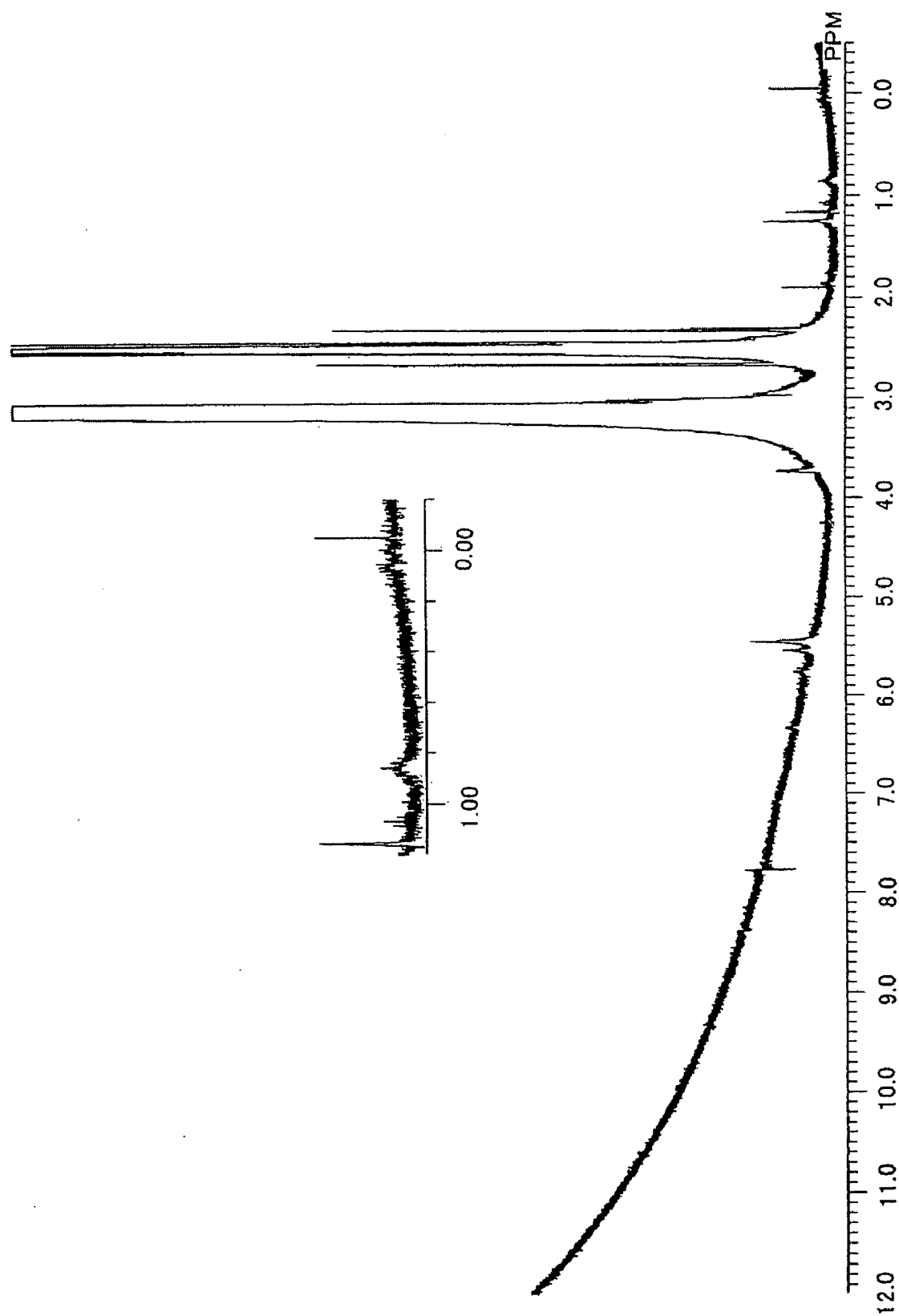
FIG. 13 is a view showing the $^1$H NMR spectrum (spectrum 11) of a silica gel obtained in Test Example 1 (2) in DMSO-$d_6$ at 80° C.

Silica gel was treated in the same manner as in the above item (4) of Example 1 except that untreated silica gel carrying no polysaccharide derivative was used. FIG. 13 shows the $^1$H NMR spectrum of a pulverized product obtained by grinding silica gel thus obtained with a mortar (spectrum 11).

The fact that no peak was observed at 0.1 to 0.6 ppm in the spectrum 11 shows that the peak observed in the above item (1) of Example 10 is a peak derived from a 3-triethoxysilylpropyl group introduced into cellulose.

(3) Analysis of a Silica Gel-Immobilized Filler

Figure 14:
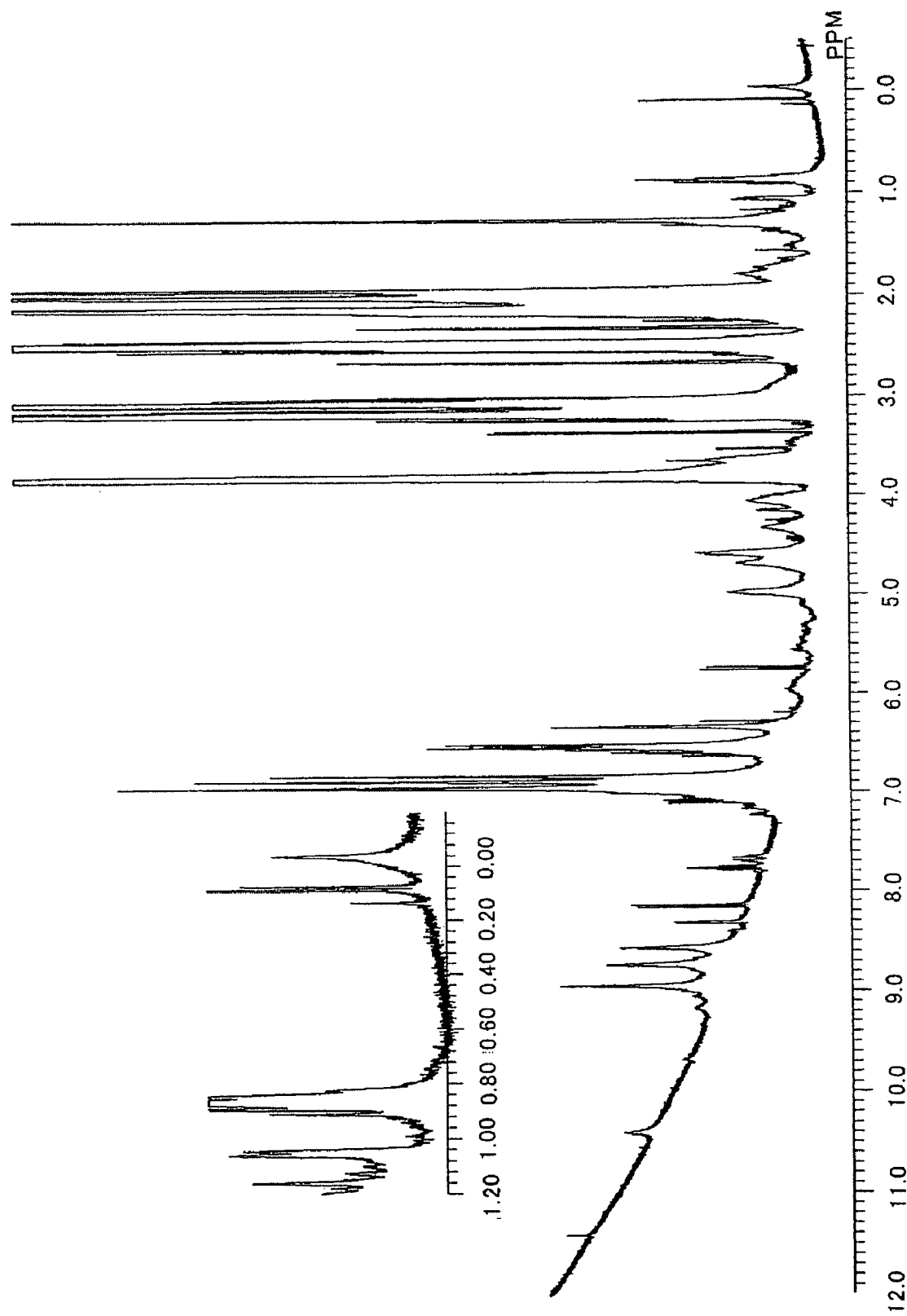
FIG. 14 is a view showing the $^1$H NMR spectrum (spectrum 12) of a silica gel obtained in Test Example 1 (3) in DMSO-$d_6$ at 80° C.

A filler was prepared as follows (see, for example, J. Polym. Sci., Part A: Polym. Chem., 41, 3703 (2003)): silica gel was caused to carry a derivative having a vinyl group (methacryloyl group) introduced into a side chain of cellulose, and then the cellulose derivative was immobilized on silica gel by radical copolymerization with styrene. The filler was ground with a mortar in the same manner as in the above item (1). The finely pulverized product was washed with THF. The THF-soluble portion was recovered from the resultant washed liquid, and was subjected to $^1$H NMR measurement. FIG. 14 shows the $^1$H NMR spectrum of the THF soluble portion (spectrum 12). The confirmation of the elution of the derivative was attained from the spectrum 12, but no peak was observed at 0.1 to 0.6 ppm in the spectrum. Accordingly, a filler prepared by immobilizing a derivative on silica gel by an approach employed in the present application and a filler prepared by immobilizing a derivative on silica gel by any other approach can be easily distinguished from each other by analyzing the fillers after immobilization.

Comparative Example 1

The following experiments (1) and (2) were performed for the purpose of replicating the approach described in Non-patent Document 1.

(1) Synthesis of Cellulose 3,5-Dimethylphenylcarbamate Having Alkoxysilyl Groups 90 ml of dehydrated pyridine were added to 2.40 g (14.8 mmol) of dried cellulose. Further, 9.0 ml (58.5 mmol) of 3,5-dimethylphenyl isocyanate and 0.9 ml (3.68 mmol) of 3-isocyanatepropyltriethoxysilane were added to the mixture, and the whole was subjected to a reaction at 90° C. for 10 hours.

Figure 15:
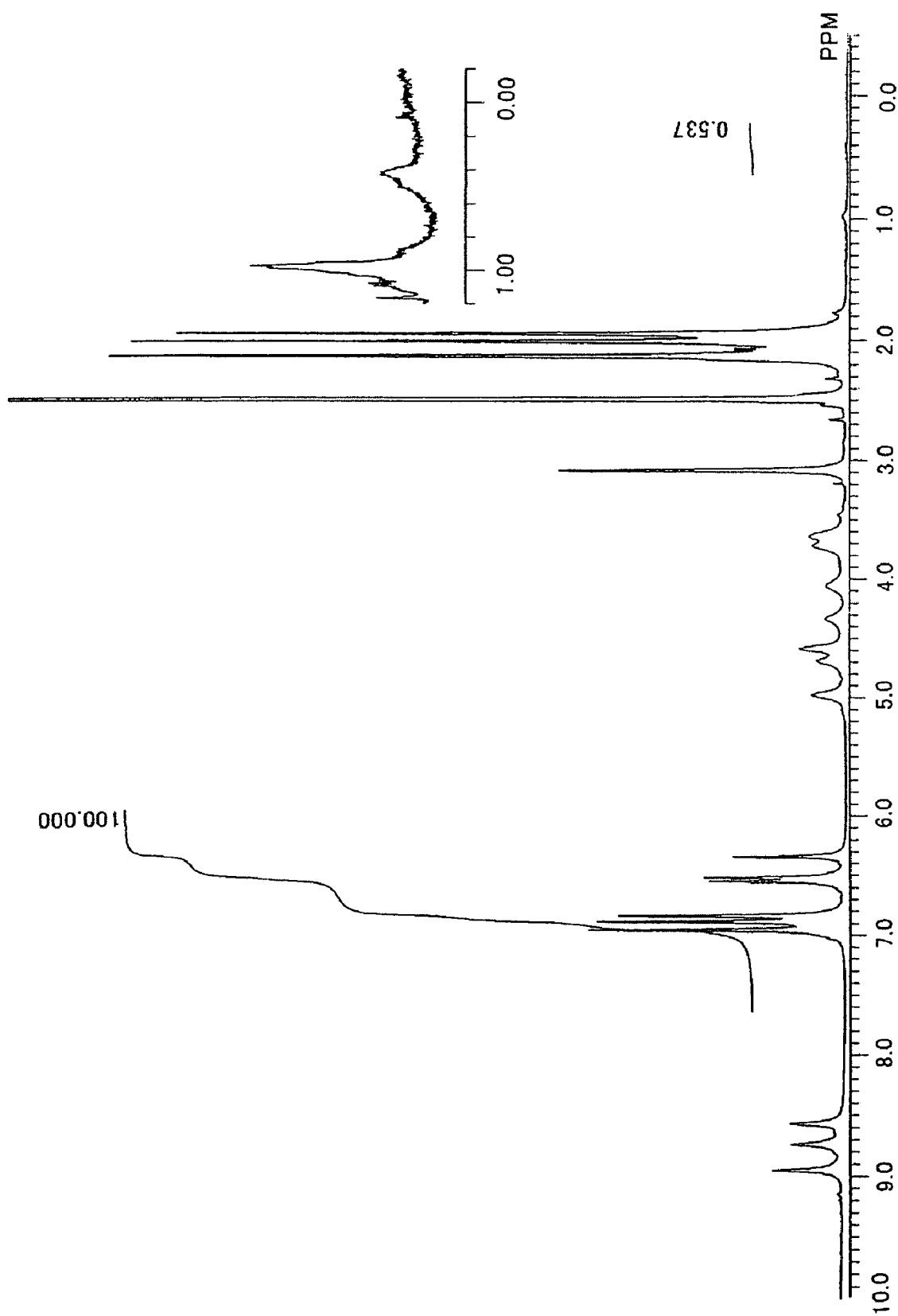
FIG. 15 is a view showing the $^1$H NMR spectrum (spectrum 13) of a derivative M obtained in Comparative Example 1 in DMSO-$d_6$ at 80° C.

The above reaction system was always non-uniform, and turned into a highly viscous solution after a lapse of 10 hours. The reaction solution was dropped into methanol, and was recovered as an insoluble portion. After that, the recovered portion was dried in a vacuum, whereby 6.30 g of a derivative M were obtained. However, most (about 62%) of the derivative M was a gel insoluble in THF. $^1$H NMR analysis of the THF-soluble portion of the derivative M confirmed that the ratio of introduction of molecules of 3,5-dimethylphenyl isocyanate and the ratio of introduction of alkoxysilyl groups were 99.3% and 0.7%, respectively. That is, nearly no alkoxysilyl groups could be introduced by this method (spectrum 13; see FIG. 15). The result coincides with the result of Non-patent Document 1. In addition, it was extremely difficult to separate the THF-soluble portion and the THF-insoluble portion from each other completely, so a pure derivative could not be isolated.

It has been generally known that the reactivity of an isocyanate having a phenyl group is much higher than that of an isocyanate free of any phenyl group. In the above production method described in Non-patent Document 1, a reaction between a hydroxy group of a polysaccharide and an isocyanate having a phenyl group probably took priority over any other reaction because both of 3-(triethoxysilyl)propyl isocyanate and phenyl isocyanate were simultaneously caused to react with the hydroxy group. Probably owing to the foregoing, in the above result of the experiment involving the use of $^1$H NMR, a signal derived from a 3-triethoxysilylpropyl group in a polysaccharide derivative became extremely small, and hence nearly no 3-triethoxysilylpropyl groups were introduced into the polysaccharide derivative.

Further, the fact that the method described in Non-patent Document 1 did not include any step of dissolving cellulose used as a raw material is also probably responsible for the fact that nearly no 3-triethoxysilylpropyl groups were introduced into the cellulose derivative.

(2) Preparation of a Silica Gel-Immobilized Filler Under a Basic Condition 550 mg of the THF-soluble portion (containing part of the insoluble portion) of the derivative M were dissolved in 12 ml of tetrahydrofuran, and 2.20 g of untreated silica gel were caused to carry the derivative in the solution, whereby Silica M-1 was obtained. 10 ml of dehydrated toluene and 4 ml of dehydrated pyridine were added to 700 mg of Silica M-1 which had been dried, and the resultant mixture was subjected to a reaction under a nitrogen atmosphere at 95° C. for 8 hours so that the derivative M was immobilized. Silica gel thus obtained was washed with tetrahydrofuran. As a result, it was confirmed (by the above thermogravimetric analysis) that 62% of the carried cellulose derivative was eluted, and the immobilization ratio was 38%. The immobilization ratio is slightly larger than a literature value. Silica gel after washing with tetrahydrofuran was defined as Silica M-2.

(3) Preparation of a Silica Gel-Immobilized Filler Under an Acid Condition 0.65 g of Silica M-1 was dispersed in a mixture of ethanol, water, and chlorotrimethylsilane (6 ml, 1.5 ml, and 0.1 ml), and the dispersed product was subjected to a reaction for 10 minutes while being boiled in an oil bath at 110° C. Thus, the immobilization of the derivative M on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative M had been immobilized was obtained. Silica gel thus obtained was washed with tetrahydrofuran. As a result, it was confirmed (by the above thermogravimetric analysis) that 77% of the carried cellulose derivative was eluted, and the immobilization ratio was 23%. Silica gel after washing with tetrahydrofuran was defined as Silica M-3.

The above result shows the following: the derivative M as a polysaccharide derivative synthesized by the method described in Non-patent Document 1 cannot be efficiently immobilized on silica gel irrespective of whether the immobilization is performed under a basic condition or an acid condition, and this inefficiency is attributable to the fact that nearly no molecules of 3-isocyanatepropyltriethoxysilane are introduced into the derivative M.

(4) Loading into a Column

Silica M-2 and Silica M-3 thus obtained were each subjected to particle size fractionation, and were then loaded into stainless steel columns, each having a length of 25 cm and an inner diameter of 0.2 cm, by a slurry method. The resultant columns were defined as a column-11 and a column 12, respectively. The column-11 and the column 12 had a number of theoretical plates (N) of 2,500 and 2,000, respectively.

(5) Evaluation for Optical Resolution

The optical resolution of ten kinds of racemic bodies shown in FIG. 2 with the columns obtained by the above operation were performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 5 shows the results of the optical resolution with the column-11 and the column 12. Values in the table are a capacity ratio k1' and a separation factor α, and a sign in parentheses represents the optical activity of an enantiomer which was previously eluted. Most racemic bodies were not retained due to the low immobilization ratio of the polysaccharide derivatives.

TABLE 5

| Racemic body | Column-11 | | Column-12 | |
|---|---|---|---|---|
| | k1' | α | k1' | α |
| 1 | 0.30(−) | 1.21 | 0.19(−) | ~1 |
| 2 | 0.34(+) | 1.33 | 0.24(+) | 1.21 |
| 3 | 0.15(−) | 1.40 | 0.11(−) | ~1 |
| 4 | 0.35(+) | 1.13 | 0.19(+) | ~1 |
| 5 | 0.42(−) | 3.82 | 0.22(−) | 3.40 |
| 6 | 0.60(+) | 1.32 | 0.31(+) | 1.27 |
| 7 | 0.35(−) | 1.23 | 0.22(−) | ~1 |
| 8 | 0.37 | 1.0 | 0.25 | 1.0 |
| 9 | 0.45(−) | 2.27 | 0.26(−) | 2.20 |
| 10 | 0.25(+) | 1.53 | 0.15(+) | 1.51 |

Eluent: hexane/2-propanol (90/10)
Column: 25 × 0.20 cm (i.d.)
Flow rate: 0.1 ml/min Comparative Example 2

The following experiment was performed with reference to Non-patent Document 1.

500 mg of the above derivative J were dissolved in 12 ml of tetrahydrofuran, and 2.00 g of untreated silica gel were caused to carry the derivative in the solution, whereby Silica J-3 was obtained. 10 ml of dehydrated toluene and 4 ml of dehydrated pyridine were added to 700 mg of Silica J-3 which had been dried, and the resultant mixture was subjected to a reaction under a nitrogen atmosphere at 95° C. for 8 hours so that the derivative J was immobilized. The resultant immobilized product was washed with methanol and dried in a vacuum, whereby 565 mg of silica gel on which the derivative J had been immobilized were obtained. Silica gel thus obtained was washed with tetrahydrofuran, and the resultant product was defined as Silica J-4. The result of the thermogravimetric analysis of each of Silica J-3 and Silica J-4 showed that only 60 of the carried derivative could be immobilized.

In addition, even in the case where a similar treatment was performed while the above amount of pyridine was changed to 0.25 or 0.125 ml, only 33% of the carried derivative could be immobilized in each case.

As described above, the immobilization of 99% of the derivative J was attained in Example 9 where the immobilization was performed under an acid condition. Accordingly, the following was found: an immobilization method involving the use of pyridine is significantly inferior in immobilization ratio of a derivative to the method of performing immobilization under an acid condition described in the present application, and hence does not qualify for the immobilization of a derivative.

Example 11

(1) Synthesis of Cellulose 3,5-Dichlorophenylcarbamate Having Alkoxysilyl Groups 45 ml of dehydrated N,N-dimethylacetamide and 3.0 g of lithium chloride were added to 1.50 g (9.26 mmol) of dried cellulose, and the mixture was swollen. After that, the resultant mixture was stirred so that cellulose was uniformly dissolved.

Figure 16:
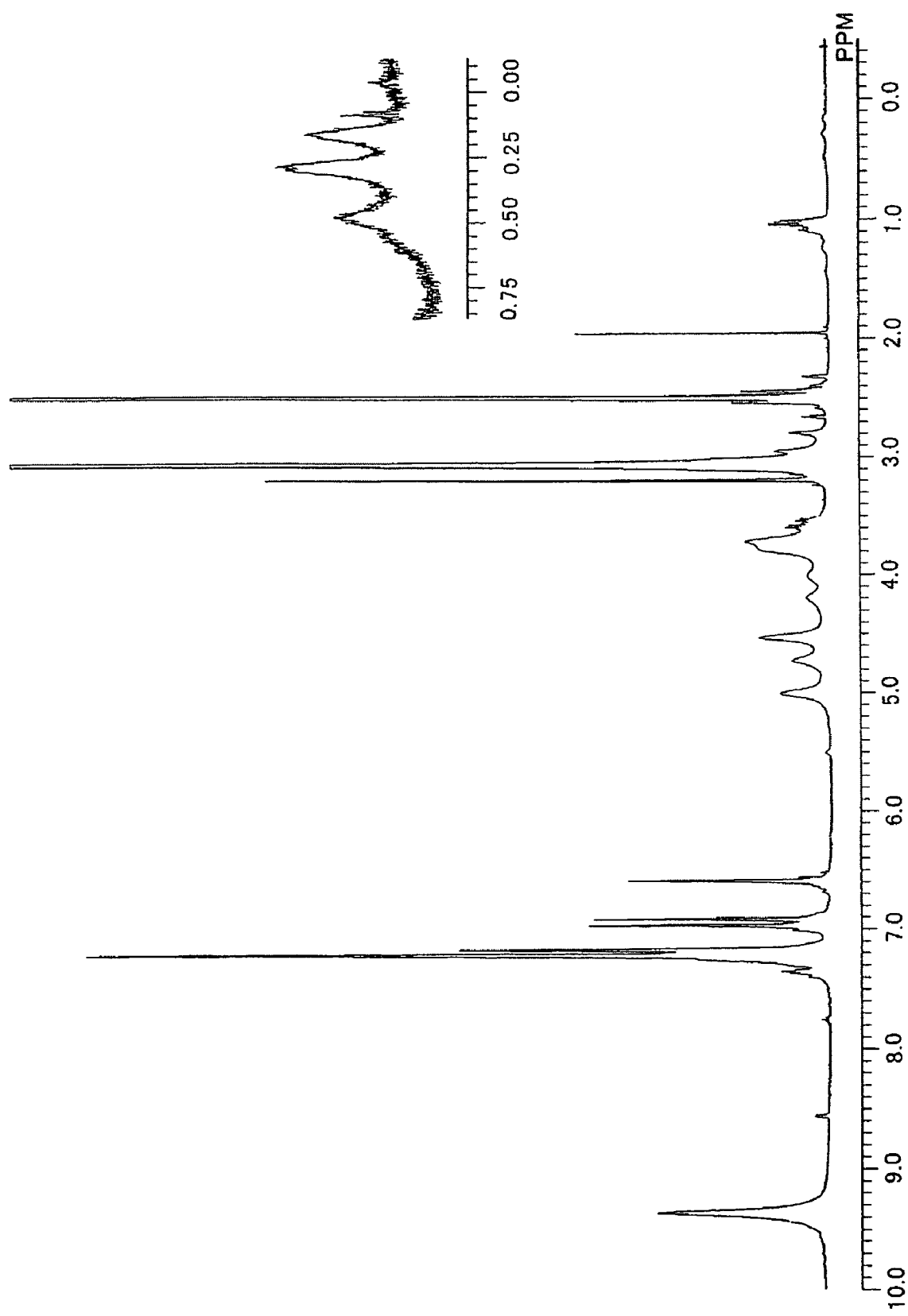
FIG. 16 is a view showing the $^1$H NMR spectrum (spectrum 14) of a cellulose 3,5-dimethylphenylcarbamate derivative N containing an alkoxysilyl group obtained in Example 11 in DMSO-$d_6$ at 80° C.

22.5 ml of pyridine and 4.35 g (23.1 mmol) of 3,5-dichlorophenyl isocyanate were added to the resultant dissolved product, and the mixture was subjected to a reaction at 80° C. for 6 hours. After that, 230 mg (0.93 mmol) of 3-isocyanatepropyltriethoxysilane was added to the resultant mixture, and the mixture was subjected to a reaction at 80° C. for 16 hours. Further, 5.22 g (27.8 mmol) of 3,5-dichlorophenyl isocyanate were added to the resultant mixture, and the mixture was subjected to a reaction at 80° C. for 7 hours. The pyridine-soluble portion was dropped into methanol, and was recovered as an insoluble portion. After that, the recovered portion was dried in a vacuum, whereby 5.84 g of a cellulose 3,5-dichlorophenylcarbamate derivative N into which alkoxysilyl groups had been introduced were obtained. $^1$H NMR results confirmed that the ratio of introduction of molecules of 3,5-dichlorophenyl isocyanate and the ratio of introduction of the alkoxysilyl groups were 96.7% and 3.3%, respectively (spectrum 14; see FIG. 16).

(2) Preparation of a Silica Gel-Immobilized Filler 400 mg of the resultant derivative N were dissolved in 8 ml of tetrahydrofuran, and 1.60 g of untreated silica gel were caused to carry the derivative in the solution, whereby Silica N-1 was obtained. 0.65 g of Silica N-1 which had been dried was dispersed in a mixture of ethanol, water, and trimethylchlorosilane (6 ml, 1.5 ml, and 0.1 ml), and the dispersed product was subjected to a reaction for 10 minutes while being boiled in an oil bath at 110° C. Thus, the immobilization of the derivative N on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative N had been immobilized was obtained. Silica gel thus obtained was washed with tetrahydrofuran. As a result, it was confirmed (by the thermogravimetric analysis) that no carried cellulose derivative was eluted, and the immobilization ratio was 100%. Silica gel after washing with tetrahydrofuran was defined as Silica N-2.

(3) Loading into a Column

Silica N-2 thus obtained was subjected to particle size fractionation, and was then loaded into a stainless steel column having a length of 25 cm and an inner diameter of 0.2 cm by a slurry method. The resultant column was defined as a column-13. The column-13 had a number of theoretical plates (N) of 1,200.

(4) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 6 shows the results of the optical resolution with the column-13.

Values in the table are a capacity ratio k1' and a separation factor α, and a sign in parentheses represents the optical activity of an enantiomer which was previously eluted.

Example 12

(1) Synthesis of Cellulose 3,5-Dichlorophenylcarbamate Having Alkoxysilyl Groups 45 ml of dehydrated N,N-dimethylacetamide and 3.0 g of lithium chloride were added to 1.50 g (9.26 mmol) of dried cellulose, and the mixture was swollen. After that, the resultant mixture was stirred so that cellulose was uniformly dissolved.

Figure 17:
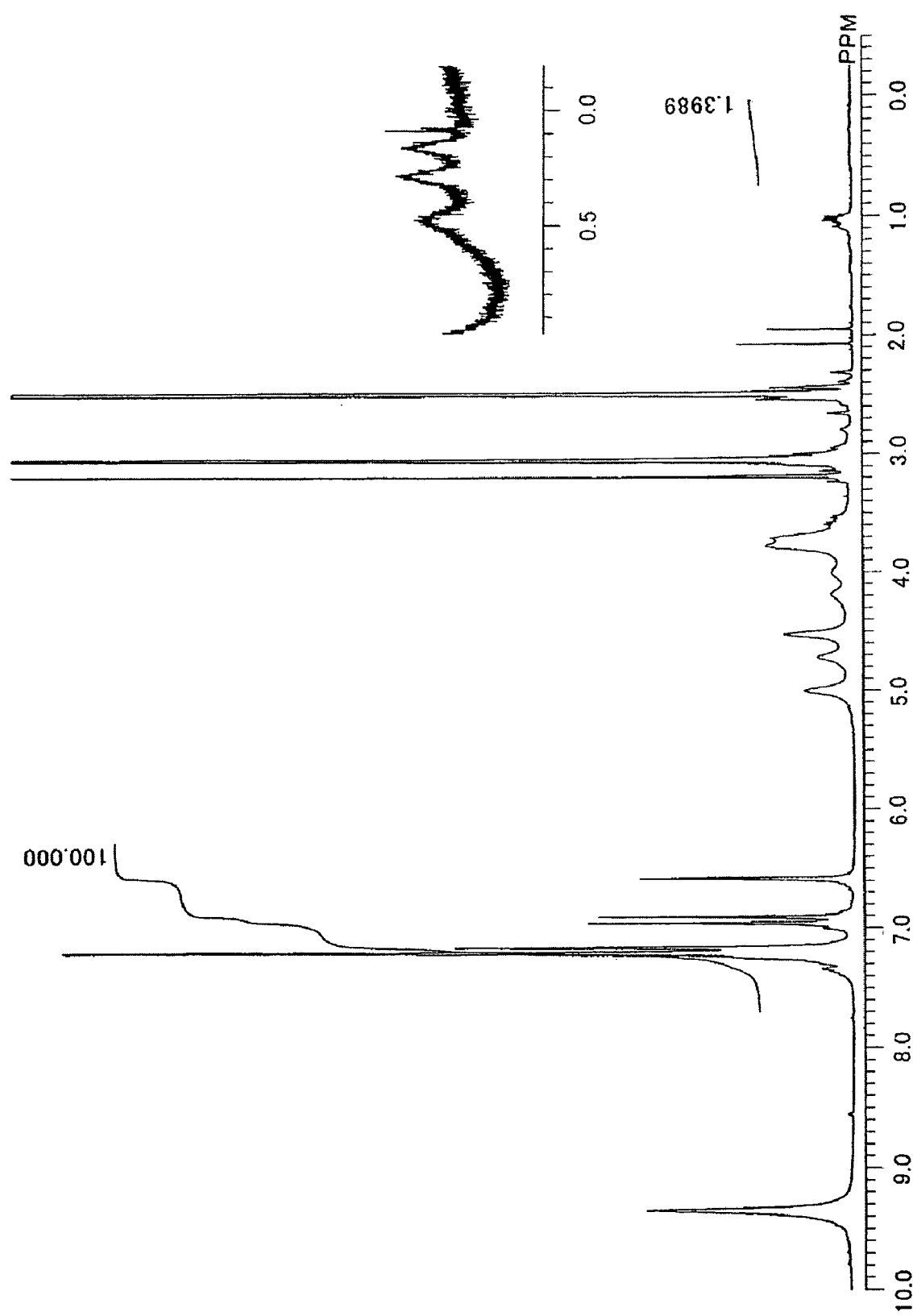
FIG. 17 is a view showing the $^1$H NMR spectrum (spectrum 15) of a cellulose 3,5-dimethylphenylcarbamate derivative O containing an alkoxysilyl group obtained in Example 12 in DMSO-$d_6$ at 80° C.

22.5 ml of pyridine and 4.35 g (23.1 mmol) of 3,5-dichlorophenyl isocyanate were added to the resultant dissolved product, and the mixture was subjected to a reaction at 80° C. for 6 hours. After that, 160 mg (0.65 mmol) of 3-isocyanatepropyltriethoxysilane was added to the resultant mixture, and the mixture was subjected to a reaction at 80° C. for 16 hours. Further, 5.52 g (29.4 mmol) of 3,5-dichlorophenyl isocyanate were added to the resultant mixture, and the mixture was subjected to a reaction at 80° C. for 8 hours. The pyridine-soluble portion was dropped into methanol, and was recovered as an insoluble portion. After that, the recovered portion was dried in a vacuum, whereby 5.30 g of a cellulose 3,5-dichlorophenylcarbamate derivative O into which alkoxysilyl groups had been introduced were obtained. $^1$H NMR results confirmed that the ratio of introduction of molecules of 3,5-dichlorophenyl isocyanate and the ratio of introduction of the alkoxysilyl groups were 98.0% and 2.0%, respectively (spectrum 15; see FIG. 17).

(2) Preparation of a Silica Gel-Immobilized Filler 400 mg of the resultant derivative O were dissolved in 8 ml of tetrahydrofuran, and 1.60 g of untreated silica gel were caused to carry the derivative in the solution, whereby Silica O-1 was obtained. 0.65 g of Silica O-1 which had been dried was dispersed in a mixture of ethanol, water, and trimethylchlorosilane (6 ml, 1.5 ml, and 0.1 ml), and the dispersed product was subjected to a reaction for 10 minutes while being boiled in an oil bath at 110° C. Thus, the immobilization of the derivative O on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative O had been immobilized was obtained. Silica gel thus obtained was washed with tetrahydrofuran. As a result, it was confirmed (by the thermogravimetric analysis) that 5% of the carried cellulose derivative was eluted, and the immobilization ratio was 95%. Silica gel after washing with tetrahydrofuran was defined as Silica O-2.

(3) Loading into a Column

Silica O-2 thus obtained was subjected to particle size fractionation, and was then loaded into a stainless steel column having a length of 25 cm and an inner diameter of 0.2 cm by a slurry method. The resultant column was defined as a column-14. The column-14 had a number of theoretical plates (N) of 2,800.

(4) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 6 shows the results of the optical resolution with the column-14.

TABLE 6

| Racemic body | Column-13 | | Column-14 | |
|---|---|---|---|---|
| | k1' | α | k1' | α |
| 1 | 2.39(−) | 1.24 | 2.25(−) | 1.25 |
| 2 | 1.03(+) | 1.30 | 0.94(+) | 1.37 |
| 3 | 0.47(+) | 1.56 | 0.42(+) | 1.70 |
| 4 | 0.49(+) | ~1 | 0.39(+) | 1.21 |

TABLE 6-continued

| Racemic | Column-13 | | Column-14 | |
|---|---|---|---|---|
| body | k1' | α | k1' | α |
| 5 | 1.50(−) | 1.09 | 1.32(−) | 1.25 |
| 6 | 3.31(−) | ~1 | 2.91(−) | 1.07 |
| 7 | 1.51(−) | 1.14 | 1.35(−) | 1.18 |
| 8 | 1.04(+) | 1.65 | 0.91(+) | 1.64 |
| 9 | 0.25(−) | 1.59 | 0.22(−) | 1.63 |
| 10 | 0.66(+) | 1.40 | 0.56(+) | 1.34 |

Eluent: hexane/2-propanol (90/10)
Column: 25 × 0.20 cm (i.d.), Flow rate: 0.1 ml/min Example 13

(1) Synthesis of Amylose (S)-1-Phenylethylcarbamate Having Alkoxysilyl Groups 15 ml of dehydrated N,N-dimethylacetamide and 1.0 g of lithium chloride were added to 0.50 g (3.09 mmol) of dried amylose, and the mixture was swollen. After that, the resultant mixture was stirred so that amylose was uniformly dissolved.

Figure 18:
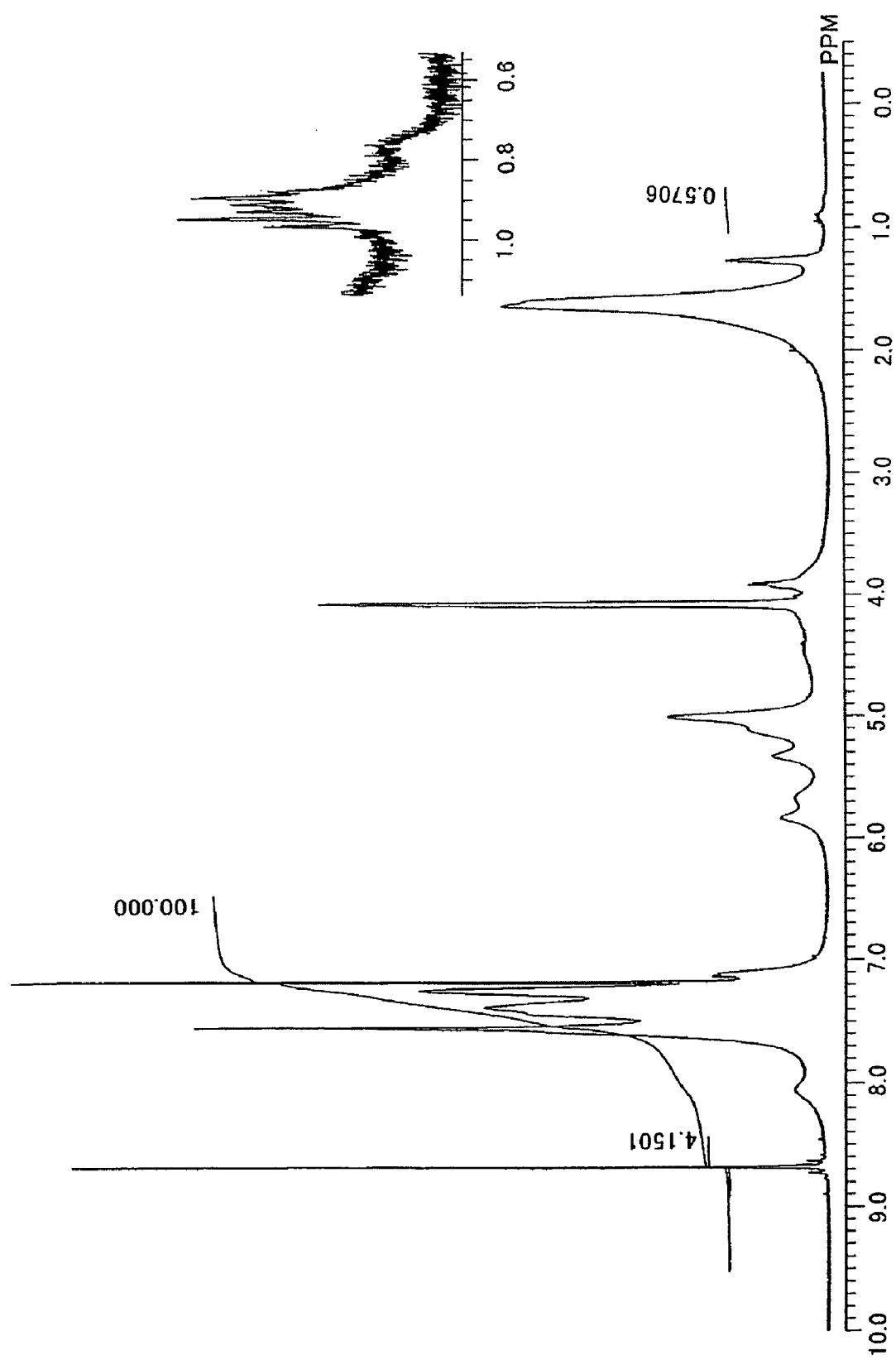
FIG. 18 is a view showing the $^1$H NMR spectrum (spectrum 16) of an amylose (S)-1-phenylethylcarbamate derivative P containing an alkoxysilyl group obtained in Example 13 in Pyridine-$d_5$ at 80° C.

7.5 ml of pyridine and 1.16 g (7.85 mmol) of (S)-1-phenylethyl isocyanate were added to the resultant dissolved product, and the mixture was subjected to a reaction at 80° C. for 12 hours. After that, 68 mg (0.28 mmol) of 3-isocyanatepropyltriethoxysilane was added to the resultant mixture, and the mixture was subjected to a reaction at 80° C. for 16 hours. Further, 1.36 g (9.26 mmol) of (S)-1-phenylethyl isocyanate were added to the resultant mixture, and the mixture was subjected to a reaction at 80° C. for 42 hours. The pyridine soluble portion was dropped into methanol, and was recovered as an insoluble portion. After that, the recovered portion was dried in a vacuum, whereby 1.69 g of an amylose (S)-1-phenylethylcarbamate derivative P into which alkoxysilyl groups had been introduced were obtained. $^1$H NMR results confirmed that the ratio of introduction of molecules of (S)-1-phenylethyl isocyanate and the ratio of introduction of the alkoxysilyl groups were 98.0% and 2.0%, respectively (spectrum 16; see FIG. 18).

(2) Preparation of a Silica Gel-Immobilized Filler 350 mg of the resultant derivative P were dissolved in 8 ml of tetrahydrofuran, and 1.40 g of untreated silica gel were caused to carry the derivative in the solution, whereby Silica P-1 was obtained. 0.65 g of Silica P-1 which had been dried was dispersed in a mixture of ethanol, water, and trimethylchlorosilane (6 ml, 1.5 ml, and 0.1 ml), and the dispersed product was subjected to a reaction for 10 minutes while being boiled in an oil bath at 110° C. Thus, the immobilization of the derivative P on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative P had been immobilized was obtained. Silica gel thus obtained was washed with tetrahydrofuran. As a result, it was confirmed (by the thermogravimetric analysis) that 1% of the carried amylose derivative was eluted, and the immobilization ratio was 99%. Silica gel after washing with tetrahydrofuran was defined as Silica P-2.

(3) Loading into a Column

Silica P-2 thus obtained was subjected to particle size fractionation, and was then loaded into a stainless steel column having a length of 25 cm and an inner diameter of 0.2 cm by a slurry method. The resultant column was defined as a column-15. The column-15 had a number of theoretical plates (N) of 1,300.

(4) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 7 shows the results of the optical resolution with the column-15.

Values in the table are a capacity ratio k1' and a separation factor α, and a sign in parentheses represents the optical activity of an enantiomer which was previously eluted.

Example 14

(1) Synthesis of Amylose (S)-1-Phenylethylcarbamate Having Alkoxysilyl Groups 15 ml of dehydrated N,N-dimethylacetamide and 1.0 g of lithium chloride were added to 0.50 g (3.09 mmol) of dried amylose, and the mixture was swollen. After that, the resultant mixture was stirred so that amylose was uniformly dissolved.

Figure 19:
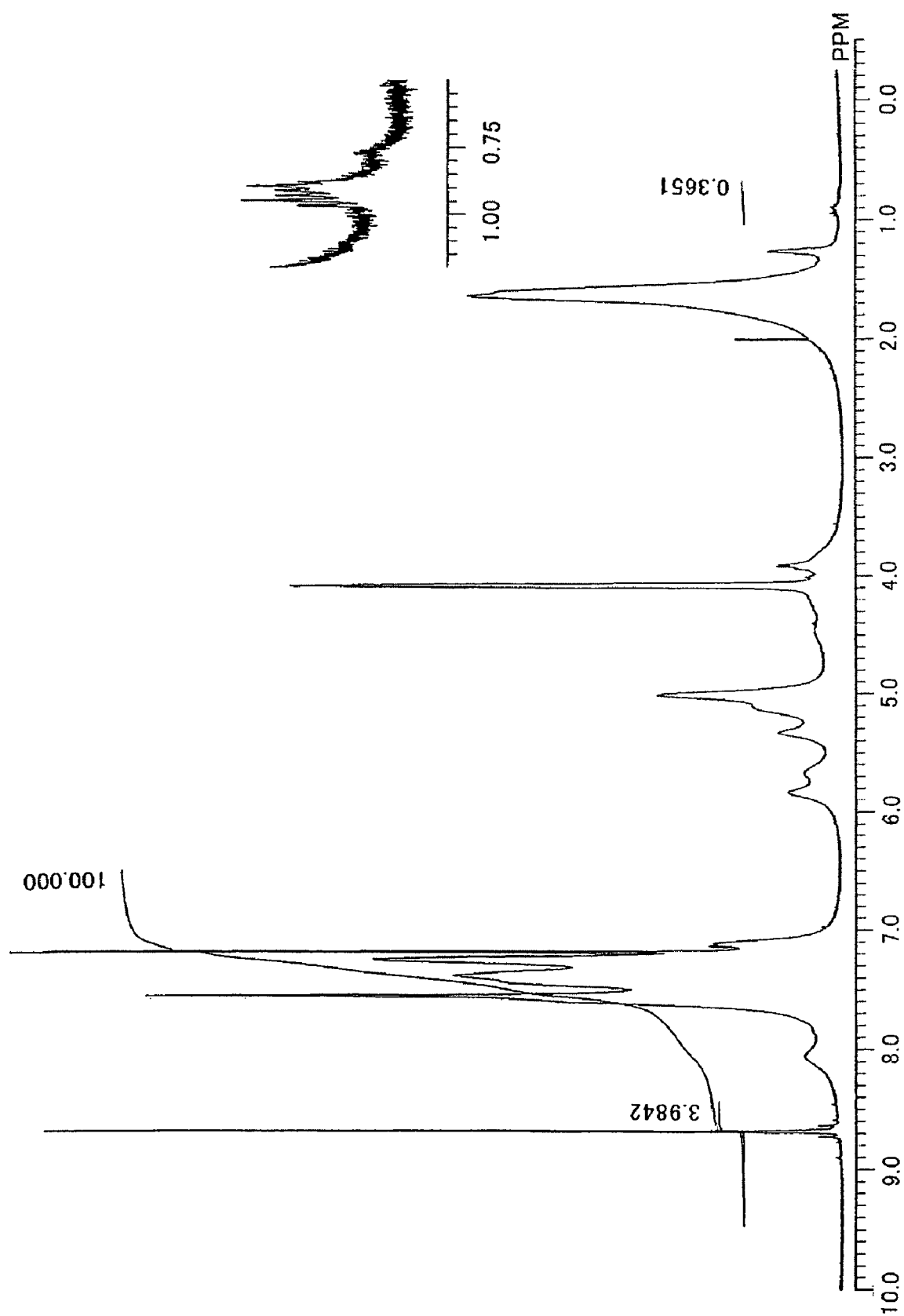
FIG. 19 is a view showing the $^1$H NMR spectrum (spectrum 17) of an amylose (S)-1-phenylethylcarbamate derivative Q containing an alkoxysilyl group obtained in Example 14 in Pyridine-$d_5$ at 80° C.

7.5 ml of pyridine and 1.16 g (7.85 mmol) of (S)-1-phenylethyl isocyanate were added to the resultant dissolved product, and the mixture was subjected to a reaction at 80° C. for 12 hours. After that, 42 mg (0.17 mmol) of 3-isocyanatepropyltriethoxysilane was added to the resultant mixture, and the mixture was subjected to a reaction at 80° C. for 16 hours. Further, 1.36 g (9.26 mmol) of (S)-1-phenylethyl isocyanate were added to the resultant mixture, and the mixture was subjected to a reaction at 80° C. for 42 hours. The pyridine-soluble portion was dropped into methanol, and was recovered as an insoluble portion. After that, the recovered portion was dried in a vacuum, whereby 1.78 g of an amylose (S)-1-phenylethylcarbamate derivative Q into which alkoxysilyl groups had been introduced were obtained. $^1$H NMR results confirmed that the ratio of introduction of molecules of (S)-1-phenylethyl isocyanate and the ratio of introduction of the alkoxysilyl groups were 98.7% and 1.3%, respectively (spectrum 17; see FIG. 19).

(2) Preparation of a Silica Gel-Immobilized Filler 350 mg of the resultant derivative Q were dissolved in 8 ml of tetrahydrofuran, and 1.40 g of untreated silica gel were caused to carry the derivative in the solution, whereby Silica Q-1 was obtained. 0.65 g of Silica Q-1 which had been dried was dispersed in a mixture of ethanol, water, and trimethylchlorosilane (6 ml, 1.5 ml, and 0.1 ml), and the dispersed product was subjected to a reaction for 10 minutes while being boiled in an oil bath at 110° C. Thus, the immobilization of the derivative Q on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative Q had been immobilized was obtained. Silica gel thus obtained was washed with tetrahydrofuran. As a result, it was confirmed (by the thermogravimetric analysis) that 5% of the carried amylose derivative was eluted, and the immobilization ratio was 95%. Silica gel after washing with tetrahydrofuran was defined as Silica Q-2.

(3) Loading into a Column

Silica Q-2 thus obtained was subjected to particle size fractionation, and was then loaded into a stainless steel column having a length of 25 cm and an inner diameter of 0.2 cm by a slurry method. The resultant column was defined as a column-16. The column-16 had a number of theoretical plates (N) of 2,300.

(4) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 7 shows the results of the optical resolution with the column-16.

TABLE 7

| Racemic body | Column-15 k1' | Column-15 α | Column-16 k1' | Column-16 α |
|---|---|---|---|---|
| 1 | 0.85(+) | 1.19 | 0.75(+) | 1.20 |
| 2 | 0.71(+) | 2.12 | 0.61(+) | 2.10 |
| 3 | 0.38(+) | 1.28 | 0.35(+) | 1.26 |
| 4 | 1.00(−) | ~1 | 0.90(−) | ~1 |
| 5 | 0.88(−) | 1.33 | 0.78(−) | 1.31 |
| 6 | 2.21(+) | 1.82 | 1.93(+) | 1.80 |
| 7 | 1.64 | 1.0 | 1.46 | 1.0 |
| 8 | 0.56(−) | ~1 | 0.52(−) | ~1 |
| 9 | 1.01(−) | 1.80 | 0.89(−) | 1.78 |
| 10 | 0.71(+) | 1.55 | 0.63(+) | 1.46 |

Eluent: hexane/2-propanol (90/10)
Column: 25 × 0.20 cm (i.d.), Flow rate: 0.1 ml/min Example 15

(1) Synthesis of Cellulose 4-Methylbenzoate Part of Hydroxy Groups of which Remain 20 ml of pyridine and 3.04 g (19.7 mmol) of 4-methylbenzoyl chloride were added to 1.00 g (6.17 mmol) of dried cellulose, and the mixture was subjected to a reaction at 80° C. for 6 hours. The reaction solution was dropped into methanol, and was recovered as insoluble matter. After that, the recovered matter was dried in a vacuum, whereby 2.87 g of a partially substituted cellulose 4-methylbenzoate derivative R' were obtained. $^1$H NMR results confirmed that the ratio of introduction of molecules of 4-methylbenzoyl chloride into the hydroxy groups of the resultant derivative was 98.7%.

Figure 20:
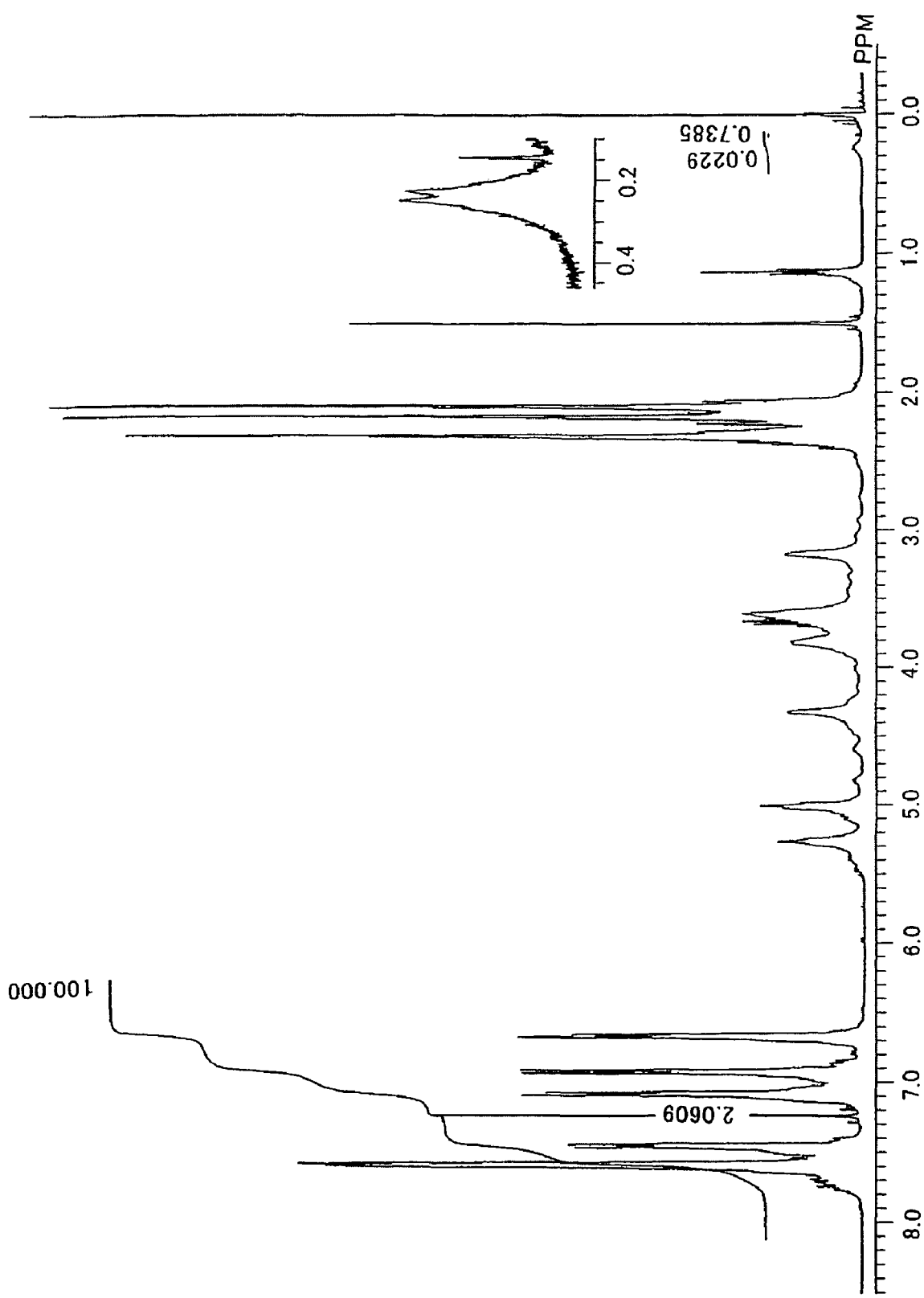
FIG. 20 is a view showing the $^1$H NMR spectrum (spectrum 18) of a cellulose 4-methylbenzoate derivative R containing an alkoxysilyl group obtained in Example 15 in CDCl$_3$ at 55° C.

(2) Synthesis of Cellulose 4-Methylbenzoate Having Alkoxysilyl Groups 20 ml of pyridine and 1.98 g (8.02 mmol) of 3-isocyanatepropyltriethoxysilane were added to 2.00 g (3.92 mmol) of the dried derivative R', and the mixture was subjected to a reaction at 80° C. for 48 hours. The pyridine-soluble portion was dropped into methanol, and was recovered as an insoluble portion. After that, the recovered portion was dried in a vacuum, whereby 0.41 g of a cellulose 4-methylbenzoate derivative R into which alkoxysilyl groups had been introduced were obtained. $^1$H NMR results confirmed that the ratio of introduction of molecules of 4-methylbenzoyl chloride and the ratio of introduction of the alkoxysilyl groups were 98.7% and 1.3%, respectively (spectrum 18; see FIG. 20).

(3) Preparation of a Silica Gel-Immobilized Filler 300 mg of the resultant derivative R were dissolved in 3 ml of chloroform, and 1.20 g of untreated silica gel were caused to carry the derivative in the solution, whereby Silica R-1 was obtained. 0.65 g of Silica R-1 which had been dried was dispersed in a mixture of ethanol, water, and trimethylchlorosilane (6 ml, 1.5 ml, and 0.1 ml), and the dispersed product was subjected to a reaction for 10 minutes while being boiled in an oil bath at 110° C. Thus, the immobilization of the derivative R on silica gel and the protection of a remaining silanol group present on silica gel or an unreacted ethoxysilyl group present in the derivative with a trimethylsilyl group were simultaneously performed. The resultant immobilized product was washed with methanol and dried in a vacuum, whereby silica gel on which the derivative R had been immobilized was obtained. Silica gel thus obtained was washed with chloroform. As a result, it was confirmed (by the thermogravimetric analysis) that 13% of the carried cellulose derivative was eluted, and the immobilization ratio was 87%. Silica gel after washing with chloroform was defined as Silica R-2.

(4) Loading into a Column

Silica R-2 thus obtained was subjected to particle size fractionation, and was then loaded into a stainless steel column having a length of 25 cm and an inner diameter of 0.2 cm by a slurry method. The resultant column was defined as a column-17. The column-17 had a number of theoretical plates (N) of 1,900.

(5) Evaluation for Optical Resolution

The optical resolution of ten kinds of racemic bodies shown in FIG. 2 with the column obtained by the above operation was performed. The detection and identification of a peak were performed with a UV detector and an optical rotation detector under the following conditions: a mixture of hexane and 2-propanol at a ratio of 90:10 was used as an eluent, and its flow rate was 0.1 ml/min. It should be noted that the number of theoretical plates N was determined from the peak of benzene, and a time $t_0$ for which the eluent passed through the column was determined from the elution time of 1,3,5-tri-tert-butylbenzene. Table 8 shows the results of the optical resolution with the column-17. Values in the table are a capacity ratio k1' and a separation factor α, and a sign in parentheses represents the optical activity of an enantiomer which was previously eluted.

TABLE 8

| Racemic body | Column-17 k1' | Column-17 α |
|---|---|---|
| 1 | 1.53(−) | 1.28 |
| 2 | 0.85(+) | 3.58 |
| 3 | 0.68(+) | 1.32 |
| 4 | 2.28(+) | 1.60 |
| 5 | 1.04(−) | 1.40 |
| 6 | 2.15(−) | 1.22 |
| 7 | 1.90(−) | ~1 |
| 8 | 0.57(+) | ~1 |
| 9 | 2.59(−) | 1.07 |
| 10 | 1.87(−) | 2.48 |

Eluent: hexane/2-propanol (90/10)
Column: 25 × 0.20 cm (i.d.), Flow rate: 0.1 ml/min

INDUSTRIAL APPLICABILITY

According to the present invention, there can be provided a filler for optical isomer separation having an excellent solvent resistance, ability to fractionate a large amount of optical isomers, and mechanical strength. In addition, according to the present invention, there can be provided a filler for optical isomer separation which: allows a polymer compound such as a polysaccharide derivative to be immobilized on the surface of a carrier at a high ratio; and is excellent in optical separation ability. Further, according to the present invention, there can be provided a method in which the number of steps upon chemical bonding of a polymer compound, such as a polysaccharide derivative, to the surface of a carrier is reduced so that the production of a filler may be efficiently performed.

The invention claimed is:

1. A method of producing a filler for optical isomer separation, comprising the steps of:
   providing a polysaccharide having hydroxy or amino groups;
   dissolving the polysaccharide in a solvent;
   modifying some of the hydroxy or amino groups of the dissolved polysaccharide with molecules of a compound represented by formula (I) to produce a polysaccharide derivative $$A-X-Si(Y)_n R_{3-n} \quad (I)$$

wherein A is a chlorocarbonyl group, a carboxyl group, an isocyanate group, a glycidyl group or a thiocyanate group, X is an alkylene group which may be branched and has 1 to 18 carbon atoms or an arylene group which may be substituted, Y is an alkoxy group having 1 to 12 carbon atoms or a halogen group, R is an alkyl group which may be branched and has 1 to 18 carbon atoms or an aryl group which may be substituted and n is an integer of 1 to 3; and
   causing a carrier to carry the polysaccharide derivative through chemical bonding under an acidic condition.

2. The method of claim 1, additionally comprising a second modifying step of modifying the remainder of the hydroxy or amino groups of the polysaccharide with molecules of the compound of formula (I).

3. The method of claim 1, wherein the polysaccharide is cellulose or amylose.

4. The method of claim 1, wherein the compound represented by formula (I) comprises 3-isocyanate propyl triethoxysilane, 3-isocyanate propyl trimethoxysilane, 3-isocyanate propyl diethoxymethylsilane, 2-isocyanate ethyl triethoxysilane, 4-isocyanate phenyl triethoxysilane, 3-glycidoxy propyl trimethoxysilane, 3-glycidoxy propyl triethoxysilane or 3-thiocyanate-propyl triethoxysilane.

5. The method of claim 1, wherein a numerical value obtained by multiplying the ratio of the sum of the numbers of polysaccharide hydroxy groups and amino groups modified with molecules of the compound represented by formula (I) to the sum of the total number of the hydroxy groups and the number of amino groups of the polysaccharide by 100 is 1.0 to 35%.

6. The method of claim 1, wherein some of the hydroxy or amino groups of the polysaccharide which weren't modified with the molecules of the compound of formula (I) are modified with molecules of a compound having a functional group which acts on an optical isomer.

7. The method of claim 6, wherein the molecules of the compound having a functional group which acts on an optical isomer are introduced into the hydroxyl or amino groups through a urethane bond, a urea bond, an ester bond or an ether bond.

8. The method of claim 6, wherein the compound having a functional group which acts on an optical isomer comprises a compound containing an atomic group represented by formula (II) or (III)

$$-CO-R' \quad (II)$$

$$-CO-NH-R' \quad (III)$$

where R' is an aliphatic or aromatic hydrocarbon group, which may contain a heteroatom, be unsubstituted or substituted with one or more groups selected from the group consisting of a hydrocarbon group having 1 to 12 carbon atoms, which may contain a heteroatom, a cyano group, a halogen group, a hydroxy group, a nitro group, an amino group and a dialkylamino group which contains two alkyl groups, each alkyl group having from 1 to 8 carbon atoms.

9. The method of claim 8, wherein the compound having a functional group which acts on an optical isomer is selected from the group consisting of 3,5-dimethylphenyl isocyanate, 3,5-dichlorophenyl isocyanate, 1-phenylethyl isocyanate and 4-methylbenzoyl chloride.

* * * * *